United States Patent
Fujiwara et al.

(10) Patent No.: US 12,034,558 B2
(45) Date of Patent: Jul. 9, 2024

(54) CONTENT DISTRIBUTION SYSTEM, MULTICAST UNICAST / MULTICAST MULTICAST CONVERTER, MULTICAST UNICAST CONVERTER, CONTENT DISTRIBUTION METHOD AND CONTENT DISTRIBUTION PROGRAM

(71) Applicant: NIPPON TELEGRAPH AND TELEPHONE CORPORATION, Tokyo (JP)

(72) Inventors: Toshihito Fujiwara, Musashino (JP); Yasunobu Kasahara, Musashino (JP); Satoshi Ikeda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 245 days.

(21) Appl. No.: 17/627,845

(22) PCT Filed: Jul. 23, 2019

(86) PCT No.: PCT/JP2019/028909
§ 371 (c)(1),
(2) Date: Jan. 18, 2022

(87) PCT Pub. No.: WO2021/014591
PCT Pub. Date: Jan. 28, 2021

(65) Prior Publication Data
US 2022/0263673 A1    Aug. 18, 2022

(51) Int. Cl.
*H04L 12/18*    (2006.01)
*H04L 67/02*    (2022.01)

(52) U.S. Cl.
CPC ............ *H04L 12/185* (2013.01); *H04L 67/02* (2013.01)

(58) Field of Classification Search
None
See application file for complete search history.

(56) References Cited

U.S. PATENT DOCUMENTS 9,402,107 B2 *   7/2016   Gonder ............ H04N 21/64761
2009/0147718 A1   6/2009   Liu et al.
(Continued)

FOREIGN PATENT DOCUMENTS

JP    2006303965 A    11/2006
JP    4665007 B2    4/2011
(Continued)

OTHER PUBLICATIONS

Bouten et al., "An autonomic delivery framework for HTTP Adaptive Streaming in multicast-enabled multimedia access networks". Apr. 1, 2012, IEEE, 2012 IEEE Network Operations and Management Symposium (pp. 1248-1253) (Year: 2012).*

(Continued)

*Primary Examiner* — Davoud A Zand
(74) *Attorney, Agent, or Firm* — Harness, Dickey & Pierce, P.L.C.

(57) ABSTRACT

The present disclosure includes a unicast-multicast converting apparatus 105, a multicast-unicast/multicast-multicast converting apparatus 113, and a multicast-unicast converting apparatus 114 are connected to a network between a content server 106 performing web delivery and a terminal 117 using a multicast communication networks 102 and 112. Through the multicast-unicast/multicast-multicast converting apparatus 113, a content group each including a plurality of contents grouped is transferred both in multicast and unicast.

9 Claims, 15 Drawing Sheets

(56) References Cited

U.S. PATENT DOCUMENTS

| | | | |
|---|---|---|---|
| 2011/0069705 A1* | 3/2011 | Glasser | H04L 69/08 |
| | | | 370/466 |
| 2013/0114597 A1 | 5/2013 | Ogisawa et al. | |
| 2014/0372624 A1* | 12/2014 | Wang | H04L 12/189 |
| | | | 709/231 |
| 2020/0021972 A1* | 1/2020 | Slater | H04W 36/328 |

FOREIGN PATENT DOCUMENTS

| | | |
|---|---|---|
| JP | 4814998 B2 | 11/2011 |
| WO | WO-2012011449 A1 | 1/2012 |

OTHER PUBLICATIONS

S. Deering, "Host Extensions for IP Multicasting", RFC 1112, Aug. 1989.

Takafumi Okuyama et al., "High-definition, high-presence CDN technology", NTT Technology Journal, vol. 30, No. 6, 2018 pp. 64-67.

Norihito Fujita and Atsushi Iwata, "Content-aware Switching using Layer-4 Switch", Proceedings of the 2002 General Conference of the Institute of Electronics, Information and Communications Engineers, Mar. 27, 2002, p. 408.

Tomonori Hirose, "Special feature: Video solutions in the broadband era, Real-time Motion Picture Delivery Technology and Its applications", Fujitsu Limited, Fujitsu, vol. 54, No. 1, 2003, pp. 16-22.

\* cited by examiner

1

CONTENT DISTRIBUTION SYSTEM, MULTICAST UNICAST / MULTICAST MULTICAST CONVERTER, MULTICAST UNICAST CONVERTER, CONTENT DISTRIBUTION METHOD AND CONTENT DISTRIBUTION PROGRAM

CROSS-REFERENCE TO RELATED APPLICATIONS

This application is a 371 U.S. National Phase of International Application No. PCT/JP2019/028909 filed on Jul. 23, 2019. The entire disclosure of the above application is incorporated herein by reference.

TECHNICAL FIELD

The present invention relates to a method for unicast-to-multicast, multicast-to-multicast, and multicast-to-unicast conversion of a plurality of pieces of unicast traffic that are different in destinations and identical in content identifiers.

BACKGROUND ART

Internet traffic amounts tend to increase year by year, particularly, in video traffic significantly. The increase in the traffic amount on the Internet means an increase in traffic over networks of network operators. In contrast, a content distributor and a network operator are required to make equipment investments so that congestion or the like does not occur.

An efficient use of transmission bands in networks may be considered to reduce equipment investments.

Examples of specific methods include multicast (NPL 1). Multicast is effective in a case of delivering the same content to multiple end users, and consumes less transmission bands than in a case of delivering addressed to each end user in a unicast manner. The more the number of receiving end users, the higher the effect, and thus, the multicast is suited for content that is expected to be received by the multiple end users.

In addition, there is also a technique for a security camera network by which a monitoring image transmitted in a unicast manner from a security camera is converted into multicast format and transmitted to a security-monitoring location (PTL 1).

There is also a technique for converting content transmitted in a multicast manner into unicast format. For example, in PTL 2, a multicast-to-unicast conversion is performed when traffic via an access line of a digital subscriber line (DSL) is transmitted over a wireless local area network (LAN) in a home. This achieves more reliable traffic transmission in the wireless LAN section.

CITATION LIST

Patent Literature

PTL 1: JP 4665007 B, "Monitoring video transmission device and method"
PTL 2: JP 4814998 B, "Method and apparatus for reliably delivering multicast data"

Non Patent Literature

NPL 1: RFC 1112, "Host Extensions for IP Multicasting"

SUMMARY OF THE INVENTION

Technical Problem

The content delivery service cannot be established without a delivery facility, a network, and a recipient terminal. Thus, mutual connectivity between these apparatuses and equipment needs to be ensured. The aforementioned multicast has problems with this connectivity.

In the content delivery service, there is a need to match conditions of traffic that is input/output in a connection interface between the delivery facility and the network (hereinafter, referred to as an application server-network interface (SNI)), and a connection interface between the network and the recipient terminal (hereinafter, referred to as a user-network interface (UNI)). The above may be referred to as IF (interface) conditions. Whether the input/output traffic is unicast or multicast is also included in the IF conditions and needs to be determined for service offering.

Here, the term "traffic" includes content and various pieces of additional information for delivering the content. For example, in a case of transmitting content stored in an IP packet, "traffic" described herein consists of an IP header and a payload in which the content is stored.

Next, a problem is shown in which the IF conditions of either or both of the SNI and UNI are multicast. Because traffic from delivery operators A and B is sent out in a multicast manner, a bandwidth consumed by the traffic requires only traffic corresponding to the number of delivery channels x one recipient terminal, and the transmission band reduction can be achieved. However, in such cases, both the delivery facility and the recipient terminal need to be equipped with functions accommodating multicast. In other words, a delivery facility capable of multicast delivery and a recipient terminal capable of receiving multicast are required, and so a facility and a recipient terminal without such functions cannot be connected.

Although an apparatus itself supporting the multicast delivery or reception is present in the community, the Internet traffic is generally unicast, so when being caused to support the multicast delivery and reception, special settings for the network for the multicast delivery and reception are required, and operation is complicated. In order to solve this problem, it is conceivable that both the SNI and the UNI are unicast. However, it is desirable that the network portion be multicast in view of efficient utilization of the transmission bands described above. The above are conflicting conditions, and thus, a technique for achieving these conditions is necessary.

As an example of such a technique, it is conceivable that content input into the SNI in a unicast manner is converted to multicast format in a network, then, delivered to multiple points, and then, converted to unicast format again at each location and output from the UNI. However, in video delivery on the assumption of the unicast, a transmission control protocol (TCP) and a hyper-text transfer protocol (HTTP) of the higher layer are often used. On the other hand, for the multicast, user datagram protocols (UDP) and real-time transport protocols (RTP) of the higher layer are used, and thus, simple IP header conversion is insufficient.

Such operations cannot be achieved, similarly to the above description, by simply combining intra-community unicast-to-multicast and multicast-to-unicast conversion techniques.

The multicast communication assumes the UDP, and thus congestion control cannot be performed. Therefore, for a plurality of reception terminals, in consideration of various reception terminal environments and the networks to be used, a low speed multicast communication is required according to the terminal environment and network having low reception capability. This may be a limitation on delivering higher image quality content.

Similarly, in the multicast communication, there may be limited utilization of address resources and the like depending on the network used for the multicast communication. Attempting to achieve this in a single multicast communication tends to limit the number of communication streams.

Therefore, an object of the present disclosure is to enable content to be efficiently transferred in an HTTP-based web delivery system while maintaining a unicast HTTP and further avoiding the limitations associated with the multicast.

Means for Solving the Problem

The present disclosure has been made to solve the above problems, and provides, in a network between a content server performing web delivery and a terminal to receive the content, a unicast-multicast converting apparatus, in other words, a unicast-multicast converter (hereinafter, referred to as a UMC), a multicast-unicast/multicast-multicast converting apparatus, in other words, a multicast-unicast/multicast-multicast converter (hereinafter, referred to as a MU/MMC), and a multicast-unicast converting apparatus, in other words, a multicast-unicast converter (hereinafter, referred to as an MUC) to convert the traffic between the UMC and the MU/MMC, and the traffic between the MU/MMC and the MUC into multicast format. This facilitates the reduction of investment in server equipment and network equipment, and achieves high image quality and stabilization of the delivered video image quality.

A content delivery system according to the present disclosure is a content delivery system in which a terminal and a content server are connected through an intermediate section using a multicast communication network in a unicast communication web delivery system, the content delivery system including: a unicast-multicast converting apparatus configured to convert a communication from a unicast communication to a multicast communication to send the communication to a first multicast communication network for transmitting a multicast communication; a multicast-unicast/multicast-multicast converting apparatus configured to send to a second multicast communication network for transmitting, again in multicast communication, the communication transmitted in a multicast manner in the first multicast communication network; and a multicast-unicast converting apparatus configured to convert the communication transmitted in the multicast manner in the second multicast communication network to a unicast communication, wherein the multicast-unicast converting apparatus includes a content receiving cache unit configured to identify content groups each including a plurality of contents grouped, receive content transmitted using either one or both of unicast communication and multicast communication schemes for each of the content groups from the second multicast communication network, and store the content included in the content group, a unicast transmission unit configured to transmit content in unicast communication from the content receiving cache unit included in the multicast-unicast converting apparatus in response to a request from a first terminal connected through the second multicast communication network, and a content request unit configured to selectively make, in a case that content corresponding to the request from the first terminal is not stored in the content receiving cache unit, a requisition for a content group including the content corresponding to the request, using either one or both of unicast communication and multicast communication schemes, the multicast-unicast/multicast-multicast converting apparatus includes a content receiving cache unit configured to identify the content group, receive content transmitted using either one or both of unicast communication and multicast communication schemes for each of the content groups from the first multicast communication network, and store the content included in the content group, a unicast transmission unit configured to transmit content from the content receiving cache unit included in the multicast-unicast/multicast-multicast converting apparatus in unicast communication in response to the request from the first terminal, a content transmission unit configured to transmit content from the content receiving cache unit included in the multicast-unicast/multicast-multicast converting apparatus using either one or both of unicast communication and multicast communication schemes for each of the content groups in response to a request from the multicast-unicast converting apparatus, and a content request unit configured to selectively make, in a case that content corresponding to the request from the first terminal or the multicast-unicast converting apparatus is not stored in the content receiving cache unit, a requisition for a content group including the content corresponding to the request using either one or both of unicast communication and multicast communication schemes, and the unicast-multicast converting apparatus includes a unicast receiving cache unit configured to receive content in unicast communication from the content server and store the content, a content transmission unit configured to read, from the unicast receiving cache unit, a content group corresponding to the request from the multicast-unicast converting apparatus or the multicast-unicast/multicast-multicast converting apparatus, and transmit the read content group to the first multicast communication network using either one or both of unicast communication and multicast communication schemes, and a unicast request unit configured to make, in a case that the content group corresponding to the request from the multicast-unicast converting apparatus or the multicast-unicast/multicast-multicast converting apparatus is not stored in the unicast receiving cache unit, a requisition to the content server for the content group corresponding to the request from the multicast-unicast converting apparatus or the multicast-unicast/multicast-multicast converting apparatus in unicast communication.

A content delivery method according to the present disclosure is a content delivery method performed by a content delivery system in which a terminal and a content server are connected through an intermediate section using a multicast communication network in a unicast communication web delivery system, the content delivery system including a unicast-multicast converting apparatus configured to convert a communication from a unicast communication to a multicast communication to send the communication to a first multicast communication network for transmitting a multicast communication, a multicast-unicast/multicast-multicast converting apparatus configured to send to a second multicast communication network for transmitting, again in multicast communication, the communication transmitted in a multicast manner in the first multicast communication network, and a multicast-unicast converting apparatus configured to convert the communication transmitted in a multicast manner in the second multicast communication network to a unicast communication, the content delivery method including: performing, by the multicast unicast converting apparatus, a content receiving cache procedure including identifying content groups each including a plurality of contents grouped, receiving content transmitted using either one or both of unicast communication and multicast communication schemes for each of the content groups from the second multicast communication network, and storing the content included in the content group in a content receiving cache unit, a unicast transmission procedure including transmitting content in unicast communication from the content receiving cache unit included in the multicast-unicast converting apparatus in response to a request from a first terminal connected through the second multicast communication network, and a content request procedure including selectively making, in a case that content corresponding to the request from the first terminal is not stored in the content receiving cache unit, a requisition for a content group including the content corresponding to the request, using either one or both of unicast communication and multicast communication schemes; performing, by the multicast-unicast/multicast-multicast converting apparatus, a content receiving cache procedure including identifying the content group, receiving content transmitted using either one or both of unicast communication and multicast communication schemes for each of the content groups from the first multicast communication network, and storing the content included in the content group in a content receiving cache unit, a unicast transmission procedure including transmitting content from the content receiving cache unit included in the multicast-unicast/multicast-multicast converting apparatus in unicast communication in response to the request from the first terminal, a content transmission procedure including transmitting content from the content receiving cache unit included in the multicast-unicast/multicast-multicast converting apparatus using either one or both of unicast communication and multicast communication schemes for each of the content groups in response to a request from the multicast-unicast converting apparatus, and a content request procedure including selectively making, in a case that content corresponding to the request from the first terminal or the multicast-unicast converting apparatus is not stored in the content receiving cache unit included in the multicast-unicast/multicast-multicast converting apparatus, a requisition for a content group including the content corresponding to the request using either one or both of unicast communication and multicast communication schemes; and performing, by the unicast-multicast converting apparatus, a unicast receiving cache procedure including receiving content in unicast communication from the content server and storing the content in a unicast receiving cache unit, a content transmission procedure including reading, from the unicast receiving cache unit, a content group corresponding to the request from the multicast-unicast converting apparatus or the multicast-unicast/multicast-multicast converting apparatus, and transmitting the read content group to the first multicast communication network using either one or both of unicast communication and multicast communication schemes, and a unicast request procedure including making, in a case that the content group corresponding to the request from the multicast-unicast converting apparatus or the multicast-unicast/multicast-multicast converting apparatus is not stored in the unicast receiving cache unit, a requisition to the content server for the content group corresponding to the request from the multicast-unicast converting apparatus or the multicast-unicast/multicast-multicast converting apparatus in unicast communication.

A multicast-unicast/multicast-multicast converting apparatus according to the present disclosure is a multicast-unicast/multicast-multicast converting apparatus connected to an intermediate section between a terminal and a content server in a unicast communication web delivery system, and capable of sending a communication transmitted in a multicast manner by a first multicast communication network to a second multicast communication network different from the first multicast communication network, the apparatus including: a content receiving cache unit configured to identify content groups each including a plurality of contents grouped, receive content transmitted using either one or both of unicast communication and multicast communication schemes for each of the content groups from the first multicast communication network, and store the content included in the content group; a unicast transmission unit configured to transmit content in unicast communication from the content receiving cache unit included in the multicast-unicast/multicast-multicast converting apparatus in response to a request from the terminal connected through the first multicast communication network; a content transmission unit configured to transmit content from the content receiving cache unit included in the multicast-unicast/multicast-multicast converting apparatus using either one or both of unicast communication and multicast communication schemes for each of the content groups in response to a request from a multicast-unicast converting apparatus, the multicast-unicast converting apparatus being capable of converting a multicast communication transmitted by the second multicast communication network to a unicast communication; and a content request unit configured to selectively make, in a case that content corresponding to the request from the terminal or the multicast-unicast converting apparatus is not stored in the content receiving cache unit, a requisition for a content group including the content corresponding to the request to the first multicast communication network using either one or both of unicast communication and multicast communication schemes.

A multicast unicast converting apparatus according to the present disclosure is a multicast-unicast converting apparatus for converting a communication from a multicast communication to a unicast communication to send the communication to a unicast communication network where a multicast communication network is connected to an intermediate section between a terminal and a content server, the apparatus including: a content receiving cache unit configured to identify content groups each including a plurality of contents grouped, receives content transmitted using either one or both of unicast communication and multicast communication schemes for each of the content groups from the multicast communication network, and store the content included in the content group; a unicast transmission unit configured to transmit content in unicast communication from the content receiving cache unit included in the multicast-unicast converting apparatus in response to a request from the terminal; and a content request unit configured to selectively make, in a case that content corresponding to the request from the terminal is not stored in the content receiving cache unit, a requisition for a content group including the content corresponding to the request to the multicast communication network using either one or both of unicast communication and multicast communication schemes.

Specifically, a content delivery program according to the present disclosure is a program causing a computer to operate as function units included in the multicast-unicast/multicast-multicast converting apparatus, the unicast-multicast converting apparatus, or the multicast-unicast converting apparatus according to the present disclosure, and is a program causing a computer to execute steps included in the content delivery program according to the present disclosure.

Effects of the Invention

According to the present disclosure, it is possible to enable content to be efficiently transferred in an HTTP-based web delivery system while maintaining a unicast HTTP and further avoiding the limitations associated with the multicast.

DESCRIPTION OF EMBODIMENTS

Hereinafter, embodiments of the present disclosure will be described in detail with reference to the drawings. Note that the present disclosure is not limited to the embodiments described below. These embodiments are just illustrative examples, and the present disclosure can be implemented in forms in which various modifications and improvements are added on the basis of knowledge of those skilled in the art. Note that components with the same reference signs in the specification and the drawings are assumed to be the same components.

In the present disclosure, an MUC in two-stage multicast may be implemented as a function of a home gateway (HGW) or set top box (STB) in a home, as another dedicated converter, or as part of functions of a terminal. Examples of the terminal includes a personal computer (PC), a smartphone, and a television receiver (TV).

In terms of efficiency of traffic, it is preferable that a multicast section is closer to the terminal, in other words, the MUC is closer to the terminal. On the other hand, an easiness to equip an MUC function depends on the environment, and in a case that a network closer to the terminal is not easy to equip with the MUC function, a near network is preferably equipped with the MUC function. In other words, in a unicast-multicast interconversion system, at a point where the MUC function is equipped, it is desirable to simultaneously support from a terminal and a network to which the terminal belongs to a network to which the terminal does not belong.

However, the points of the MUCs different in characteristics, for example, an MUC connected to a communication network in a home and an MUC connected to a carrier communication network are different in the environments of the networks passed through concerning these MUCs and the terminals, and thus, only a single multicast communication is not sufficient. For example, it is conceivable that the bands of the networks differ or the available multicast addresses differ. Even if there are only some limited network bands or some limited address ranges, the overall multicast communication will be constrained by some network limitations.

Termination of the multicast communication for each network section can avoid the constraints described above. For example, changing the address or a communication speed for each network section can avoid the constraints. This can allow for the address or the communication speed differentiated also for each of a plurality of second multicast networks.

While the content delivered in the present disclosure assumes video content, other content (e.g., images, web pages, update files of an operation system (OS), definition files for anti-virus software, etc.) can also be delivered in the present disclosure.

First Embodiment

Figure 1:
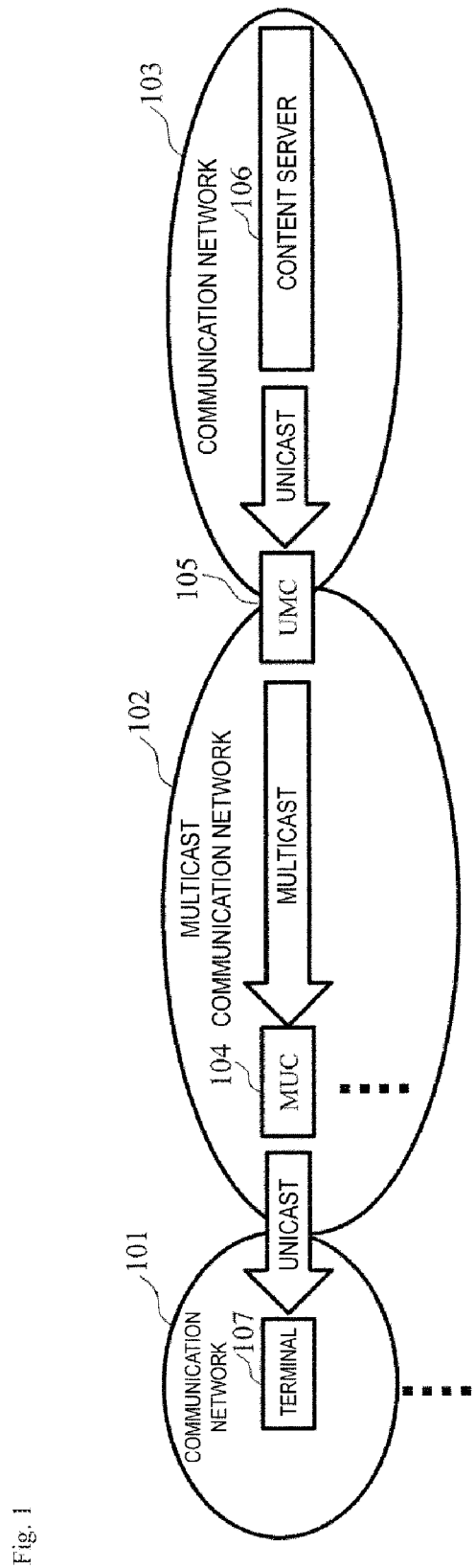
FIG. 1 illustrates an example of a system configuration according to a first embodiment.

FIG. 1 illustrates an example of a network configuration provided with a content delivery method according to the present disclosure. A delivery system according to the present disclosure includes a content server 106, a UMC 105, an MUC 104, and a terminal 107. A multicast communication network 102, which is a network capable of multicast communication, exists between the content server 106 and the terminal 107. In FIG. 1, a network 101 and a network 103 are different networks, but may be a single network.

The UMC 105 is located at a boundary between the network 103 and the network 102 or in the network 102, and the MUC 104 is located at a boundary between the network 102 and the network 101 or in the network 102.

In the absence of the UMC 105 and the MUC 104, the content server 106 and the terminal 107 communicate with each other using an HTTP in a unicast manner. In this delivery system, the UMC 105 and the MUC 104 are located in the middle, and the UMC 105 converts basically communication from unicast to multicast and the MUC 104 converts basically the communication from multicast to unicast. As a result, the present disclosure eliminates the need to change the method of connection for the web delivery between the content server 106 and the terminal 107. The number of the MUCs 104 is one or more, and each MUC is connected to zero or more terminal 107.

Here, the MUC 104 basically converts the communication from multicast to unicast, but the communication before conversion may include or only be a unicast communication. The UMC 105 basically converts the communication from unicast to multicast, but the converted communication may include or only be a unicast communication. In a case that the MUC 104 and the UMC 105 perform only the unicast communications, the system according to the present disclosure is substantially equivalent to a multi-stage web proxy system. The present disclosure is a system that adaptively converts into multicast format, a portion of communication (between the UMC 105 and the MUC 104) in a web proxy system (the UMC 105 and the MUC 104 in the present disclosure) that is the application layer.

Figure 2:
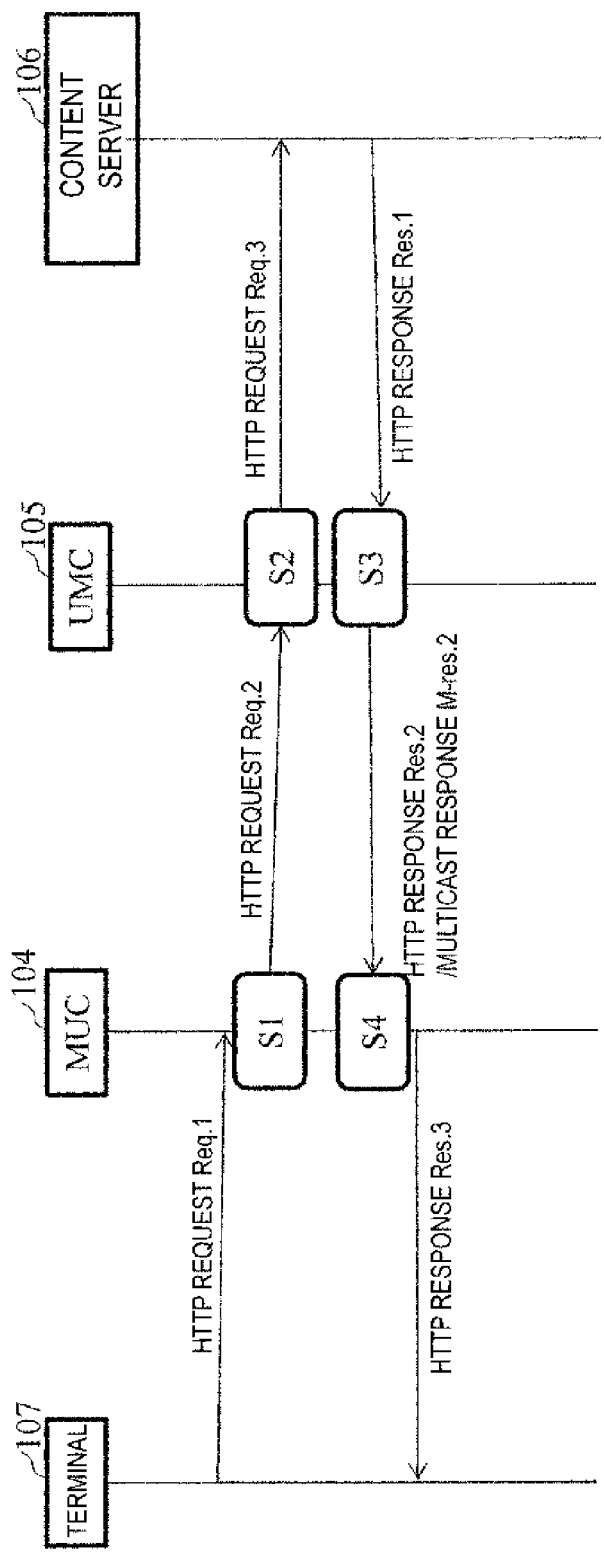
FIG. 2 illustrates a sequence of the first embodiment in a case that an MUC and a UMC have no cache.

FIG. 2 illustrates a flow of communication in a case that the MUC 104 and the UMC 105 have no cache.

An HTTP request req.1 from the terminal 107 is transmitted to the MUC 104 that is a proxy.

The MUC 104 receiving the req.1 performs step S1. In step S1, the MUC 104 determines that there is no cache corresponding to the HTTP request req.1 from the terminal 107, and transfers an HTTP request req.2 to the UMC 105 that is a higher proxy server. Similarly, in step S2, the UMC 105 determines that there is no cache corresponding to the HTTP request req.2 from the MUC 104, and transfers an HTTP request req.3 to the content server 106.

The content server 106 sends a content file corresponding to the req.3 using an HTTP response res.1 as a response to the UMC 105. The UMC 105 receiving the res.1 performs step S3. In step S3, the UMC 105 uses the content file included in the res.1 to generate a cache file, and sends the cache file as a response to the UMC 104. Here, the response from the UMC 105 to the MUC 104 is a response corresponding to the HTTP request req.2, and may employ any of an HTTP response res.2, a multicast response M-res.2, and both the res.2 and the M-res.2.

The MUC 104 receiving the res.2 or the M-res2 performs step S4. In step S4, the MUC 104 stores the cache file included in the res.2 or the M-res.2. The MUC 104 sends the stored cache file using an HTTP response res.3. The res.3 is a response corresponding to the HTTP request req.1 to the terminal 107. Note that the caches of the MUC 104 and UMC 105 are cleared at appropriate times in accordance with a storage capacity limit of a disk or the like, or a delivery policy.

As described above, the present disclosure can use messages of the Res.2 that is the unicast communication and the M-res.2 that is the multicast communication to expect the following effects.

The multicast communication causes unnecessary unicast communication to be reduced, and thereby, the usage band of the network and the load on the server can be reduced. This makes it possible to more stably deliver a higher quality video than the case of using the unicast communication only.

In the environment in which the multicast communication cannot be interacted, it is possible to ensure interaction by the conventional unicast communication. The environment in which the multicast communication cannot be interacted may include an environment in which the multicast communication is not supported, as well as a temporary non-interactive environment in which there is a depletion of the number of multicast addresses or multicast routes, or an excess of a multicast traffic amount, and the like. In addition, in a case of a network that dynamically generates multicast route, delivery in the unicast communication prior to that route being generated allows a time until video playback start to be shortened.

Utilizing the unicast communication for retransmitting multicast communication data can improve reliability. This is because, in particular, retransmitting the multicast packet due to packet loss in the transmission line, reception errors of the receiver (MUC 104), or the like involves transmitting the multicast packet to other MUCs 104 besides the MUC 104 of the reception error, and thus, it is desirable to perform the retransmission for the individual MUC 104 in order to mitigate loads on the network bands and other MUCs 104.

Similarly, on a web-based system, requests for an identical file from a plurality of terminals 107 do not necessarily occur at the same timing. Thus, in a case of a request from the terminal 107 after the cache is cleared in a particular MUC 104, delivery in the unicast communications is desirable rather than the multicast communications. This is because if other MUC 104 than the particular MUC 104 holds a cache file, the delivery thereof is wasted.

This system can support delivery of low real-time content by the cache as well as delivery of real-time content.

Figure 3:
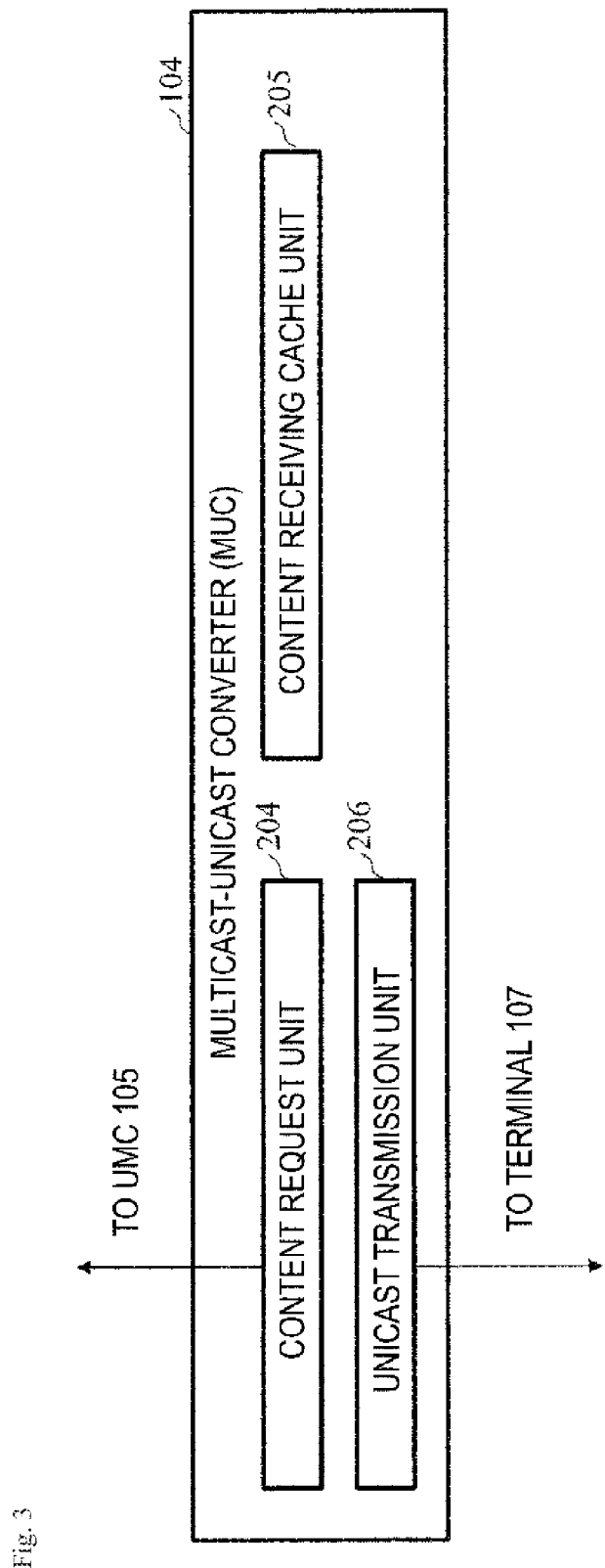
FIG. 3 illustrates an example of a function provided to the MUC.

FIG. 3 illustrates an example of the function of the MUC 104 for performing the steps in FIG. 2. The MUC 104 includes a content request unit 204, a content receiving cache unit 205, and a unicast transmission unit 206.

The unicast transmission unit 206 reads a content file corresponding to the req.1 from the content receiving cache unit 205 based on the request req.1 from the terminal 107, and transmits the read content file to the terminal 107 using the res.3 in the unicast communication. This cache is a file or stream in the HTTP. The cache may not be a complete file, and only part of data can be transmitted sequentially as the unicast communication. This enables the terminal 107 to communicate with the unicast transmission unit 206 in the MUC 104 in a similar manner to the processing of transmitting the HTTP request and receiving the HTTP response directly to and from the content server 106.

In a case that the content request unit 204 has no cache corresponding to the request from the terminal 107, the content request unit 204 makes a requisition to the UMC 105 for the content using the req.2. The requisition is selectively made by the communication scheme of either or both of the unicast communication and multicast communication. For example, the requisition utilizes an HTTP request and the selective requisition is differentiated using an HTTP header.

The content receiving cache unit 205 identifies the requested content from the content request unit 204 with a content group grouping a plurality of contents. The content receiving cache unit 205 selectively receives and caches the content for each content group by the communication scheme of either or both of the unicast communication and multicast communication. The content here is, for example, a file. In the web delivery system, because a plurality of files may form one video program, the plurality of files can be handled as one content group when being converted into a stream such as a multicast stream, to be efficiently converted into multicast communication. In other words, when transferring different files in one video program, the transfer can be advantageously performed using the same multicast source address and group address.

Here, in the content receiving cache unit 205, the selective receiving of the content by the communication scheme of either or both of the unicast communication and multicast communication may include, for example, performing the unicast communication before a multicast path is established, or in a network where multicast is not transferred for some reason, and then, performing the multicast communication after the multicast path is established.

A case may be included that, in a case that multicast communication is not received for some reason and the like, the data is transferred only to an MUC 104 not receiving the multicast communication. The case that multicast communication is not received may include a reception error such as packet loss, and additionally, a case that a reacquisition is required because of caching out in the MUC 104 after the multicast is received, a case that although the multicast has been delivered from the UMC 105, data is not acquired because the MUC 104 is not ready to receive, and the like.

Combining the multicast and unicast communications in this way enables the network equipment and bands to be efficiently utilized by using the multicast communications for high broadcast and instantaneous content, and using the unicast communication for error recovery, or low broadcast or instantaneous content.

Figure 4:
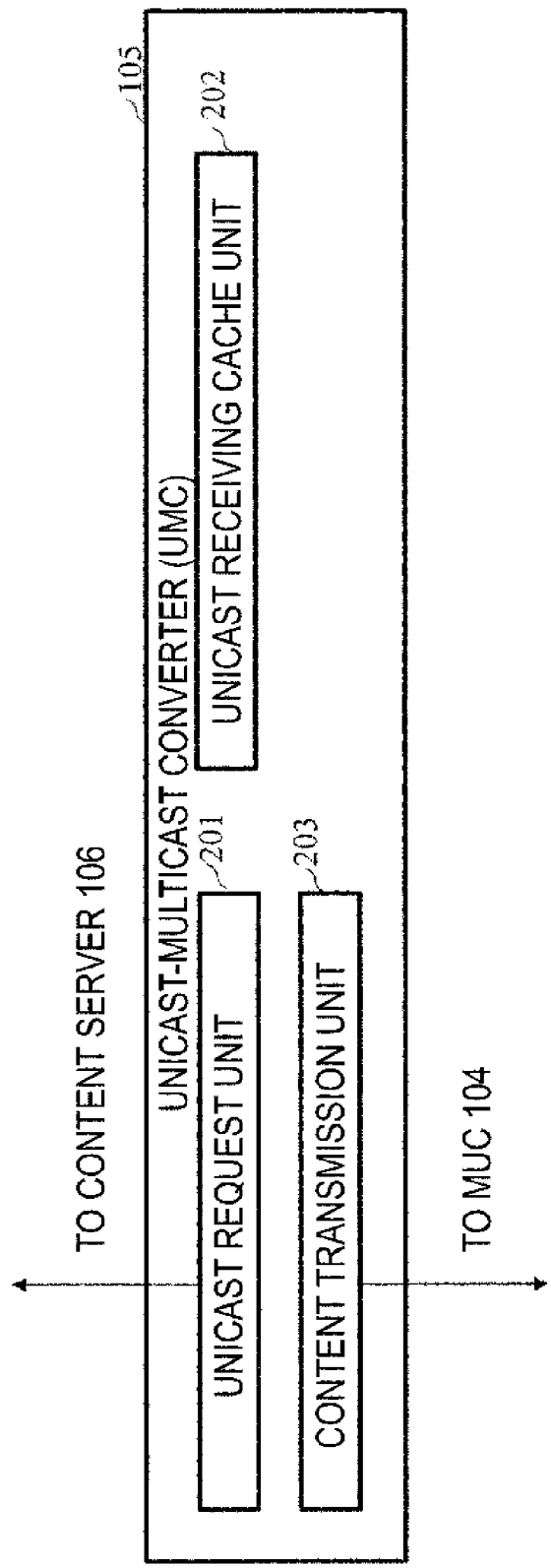
FIG. 4 illustrates an example of a function provided to the UMC.

FIG. 4 illustrates the function of the UMC 105 for performing the steps in FIG. 2. The UMC 105 includes a unicast request unit 201, a unicast receiving cache unit 202, and a content transmission unit 203.

The content transmission unit 203 reads content from the cache based on the request from the MUC 104 and transmits the read content to the MUC 104. At this time, the MUC 104 selectively transmits the content for each content group by the communication scheme of either or both of the unicast communication and multicast communication. In this way, the UMC 105 and the MUC 104 cooperate to receive either or both of the unicast communication and multicast communication, or selectively receive the unicast communication and multicast communication.

For example, the content receiving cache unit 205 provided to the MUC 104 has a mechanism for notifying the UMC 105 of whether being able to receive a target multicast signal. This allows the content transmission unit 203 in the UMC 105 to switch the unicast communication to the multicast communication.

For example, the content receiving cache unit 205 provided to the MUC 104 receives both a multicast signal and a unicast signal before the multicast path is established. In a case that the multicast path is not established yet, the content receiving cache unit 205 generates the cache with the unicast signal. Because the content receiving cache unit 205 has received the multicast signal, the content receiving cache unit 205 can determine to be able to receive a multicast signal.

For example, in a case that the UMC 105 transmits only a multicast signal, and the MUC 104 receives the signal, part of which is failed to be received by the MUC 104, the content receiving cache unit 205 determines to not be able to receive a multicast signal. In this case, the content request unit 204 specifies the unicast signal to make a requisition to the content transmission unit 203.

The unicast request unit 201 makes a requisition to the content server 106 for content in the unicast communication in a case of no content in the cache corresponding to the request from the content request unit 204. For example, this requisition uses the HTTP, the content server 106 does not need to include a special connection interface with the system, and a process similar to directly receiving of an HTTP request in the normal terminal 107 may be used.

The unicast receiving cache unit 202 receives and caches the content transmitted in the unicast communications from the content server 106 based on the request from the unicast request unit 201.

Note that in the present disclosure, there is assumed to be a plurality of MUCs 104. In the case that the MUC 104 has no cache, content is requested to the content server 106 in the order of the req.1, the req.2, and the req.3, and a response is provided to the terminal 107 while the cache is sequentially generated with the res.1, the res.2, and the M-res.2, and the res.3.

Requests from different terminals for the same content contain time differences, and so, in a case that the same MUC 104 makes a response to a request delayed from the first request for the same content, the response is directly sent from the content receiving cache unit 205. Even in a case that the response is made by another MUC 104, if the content has been delivered in a multicast manner or the like, the response is similarly sent from the content receiving cache unit 205. In the case that the response is made by another MUC 104, and if the content is not delivered from the UMC 105, the req.2 is sent to the UMC 105, but the UMC 105 waits for the content corresponding to the request, and the MUC 104 waits for multicast or unicast delivery. In the case that the response is made by another MUC 104, and if the content is already delivered from the UMC 105 in the multicast or the like, the MUC 104 may have a reception error or may not join a multicast group of an IP multicast, and thus, the res.2 is sent from the UMC 105 in the unicast communication.

Second Embodiment

In the present embodiment, a method for identifying a content group will be described. The unicast receiving cache unit 202 generates a content group grouping a plurality of contents. At this time, the unicast receiving cache unit 202 generates a content group identifier for identifying the content group grouping the plurality of contents.

For example, the unicast receiving cache unit 202 generates a content group identifier by extracting part of the content identifier including a content location, a file name, and the like.

In this way, the same content group may have the same identifier.

For example, in the HTTP, a Uniform Resource Locator (URL) is used in specifying the content. The URL includes a hostname, a path, a filename, a query string, and the like. Now, it is assumed that a plurality of files of URLs described below form one video program.

http//www.example.org/contents1/streams0001.ts
http//www.example.org/contents1/streams0002.ts
. . .
http//www.example.org/contents1/streamsxxxx.ts In this case, for example, those having identical "www.example.org/contents1" are identified as of the same video program, in other words, the same content group. In this case, "http//www2.example.org/contents1/streams0001.ts" and "http//www.example.org/contents2/streams0001.ts" are identified as of other content groups.

The content group identifier generated by extracting part of these content identifiers need not necessarily be known so long as it is predictable. For example, assuming that, in cases that in "http//Y-HOST/Z-PATH/streams-X-NUMBER.ts", "Y-HOST" matches some hostname, "Z-PATH" matches some pass, and "X-NUMBER" matches some number, those having the same in "Y-HOST/Z-PATH" portion are of the same content group.

These can be implemented with regular expression matching. In not a case of a prescribed content group identifier or a predictable content group identifier, another content group may be determined to perform the multicast communication.

In order to identify a content group grouping a plurality of contents, a function may be provided that lists and groups the plurality of contents as a video, and identifies a content group in accordance with a manifest file indicating locations of the contents.

In a web video delivery system, a manifest file is utilized to regard a plurality of files as one content group and indicate files to be downloaded. Thus, the manifest file can be analyzed to regard a group of files described in the manifest as the same content group.

In the case that the same content group is identified from the content identifier, the content group identifier, which is a subset of the content identifier, needs to be known or predictable, but in the case that the content is identified from the manifest, the content identifier does not need be known.

Although the content identifier in the manifest file may be known, in the web video delivery system, a file extension of the manifest file includes m3u8, mpd, and the like which are known depending on the scheme, and thus, a manifest file may be determined from the file extension to perform the analysis.

Third Embodiment

In the present embodiment, the multicast communication of the content group will be described. The content group may include a function to control or differentiate a multicast group address, a source address, a port number, and a packet priority to perform the multicast communication.

In an Internet group management protocol (IGMP) or a multicast listener discovery (MLD) in the IP multicast, the same multicast group is identified using the multicast group address that is a destination, or together using the source address that is a transmission source.

Therefore, in the present disclosure, in the case of using the IP multicast as the multicast communication, the same content group may be assigned with the same multicast group address or together with the source address to perform communication. In addition to determining the same multicast group as the IP multicast, the port number and the packet priority may be set and differentiated.

It is conceivable that a Cos value of the Ethernet (trade name), an IP Precedence of the header of the IP packet, a DSCP and the like are used for the packet priority. By differentiating the port number, it is possible to use a single multicast group of IP multicast in small portions, or to make filtering easier to perform in a firewall or the like. By differentiating the packet priority as needed, it is possible to prioritize the content group as a service.

Moreover, the content group determination and the corresponding transmission and reception using identifiers for the multicast communication such as the multicast group address, the source address, the port number, the packet priority, and the like can be performed by the MUC 104 and the UMC 105, and some or all of these pieces of information can be centralized and managed by the UMC 105 or the like. In this case, the MUC 104 and the UMC 105 may make a management inquiry at the time of execution of step S1 or S4, and step S2 or step S3, respectively.

Fourth Embodiment

The system according to the present embodiment includes a function to discriminate between content for multicast and content not for multicast.

The content request unit 204 in the MUC 104 has a function to determine whether content is content for multicast, and make, in not a case of the content for multicast, a requisition to the UMC 105 or the content server 106 for the content in the unicast communication. The content transmission unit 203 in the UMC 105 has a function to transmit content in a unicast manner in a case of receiving a unicast request from the MUC 104. In addition to the content using the multicast communication in combination, content using the MUC 104 or the UMC 105 as a common web proxy system may coexist.

In the case of using the multicast communication, execution of processing that identifies the content group and makes each a different multicast communication is required, but in the web proxy, prior simple process branching is generally possible using a file extension or the like. For example, for a file extension of other than a video, processing can be performed as the web proxy system as is without transitioning to the step of performing processing and determination using the multicast communication. As a result, the system of the present disclosure can simplify the multicast-conversion process and can accept an HTTP request other than a multicast-conversion target such as a video, and can be used as a general purpose proxy.

Fifth Embodiment

The system according to the present embodiment has a multicast dynamic join/leave function. In a case that requested content is content for multicast, the content request unit 204 in the MUC 104 determines whether the multicast group membership corresponding to the content group is owned or not. In a case that the multicast group membership is not owned, the content request unit 204 sends out a join signal. On the other hand, in a case that there is no requisition for content of the content group corresponding to the joined multicast group for a predetermined time, the content request unit 204 sends out a leave signal for leaving from the multicast group.

The IP multicast requires registration of the corresponding multicast group with a router. The present embodiment can dynamically perform multicast route joining/leaving every time the multicast communication of interest occurs as well as statically joining. For example, the IGMP or the MLD can be used for a scheme of this dynamic joining/leaving.

This dynamic joining/leaving allows the multicast communication of the unwatched content group to be not performed in a plurality of MUCs 104, suppressing unnecessary traffic. In a case that a limitation is put on the number of registrations of the multicast groups, the number of registrations can be suppressed. Note that it may be assumed that a static multicast group is configured to the router.

Sixth Embodiment

The system according to the present embodiment performs the unicast communication prior to the multicast joining. In the multicast communication network 102, the MUC 104 sends out the join signal and the multicast route to the MUC 104 is established, and thereafter, content can be delivered using the multicast communication to the MUC 104. The present disclosure can support dynamic multicast joining/leaving function of the MUC 104 in this manner.

Specifically, the content request unit 204 sends out the join signal, and thereafter, makes a requisition to the UMC 105 for the content in the unicast communication, before the multicast route is established. In this case, the content receiving cache unit 205 receives the content from the UMC 105 in the unicast communication and caches the received content. On the other hand, the content transmission unit 203 in the UMC 105 transmits content in a unicast manner in the case of receiving a unicast request from the MUC 104.

In this regard, the transmission and reception of the content from the UMC 105 to the MUC 104 is possible, in dynamically setting the multicast group to the router also during a propagation and setting time thereof. In this case, the MUC 104 can explicitly indicate unnecessity of multicast by using the req.2. The UMC 105 receiving this message is sure to send the res.2 as a response in the unicast communication.

The UMC 105 can also send together the M-res.2 as a response in the multicast communication. In this case, the UMC 104 generates the cache by receiving the res.2 without waiting for the M-res.2 to arrive.

The completion of dynamic registration of the multicast group joining to the router is easily configurable by a timer. After a set time elapses, the registration of the multicast group to the router is assumed to be made, and the operation can be performed on the assumption of the multicast communication.

As described above, the UMC 105 can also simultaneously transmit the res.2 and the M-res.2. The MUC 104 can determine that the dynamic registration of the multicast group joining to the router is completed on the basis of receiving the M-res.2.

After the MUC 104 determines that the multicast communication is possible, such as the completion of registration to the multicast group, a requisition only for the M-res.2 of the multicast communication can be made in the res.2.

Seventh Embodiment

The system according to the present embodiment has a FEC function for the multicast communication. The content transmission unit 203 in the UMC 105 may has a function, in a multicast transmission function, to add forward error correction code (FEC) information to perform multicast-transmission. In this case, the content receiving cache unit 205 in the MUC 104 has a function to correct a multicast signal to which the FEC information from the UMC 105 is added, based on the FEC information.

The communication in the IP multicast is a one-to-many communication, and individual error correction such as automatic repeat request (ARQ) cannot be performed. Thus, by adding a certain redundancy data as the FEC information, it is possible to compensate for data defects caused by packet loss in the transmission line, packet reception errors by the receiver, and the like. This allows for stable communication even in the case of the unstable transmission line prone to the packet loss or the receiver incapable of stably receiving the packet.

The FEC used for the multicast communication may employ the following configuration. For example, the content information before the FEC is added and the added FEC information are transmitted in a multicast manner as different packets. In this case, the packet of the content information before the FEC information is added and the packet of the added FEC information differ in part or all of the multicast group address, the source address, the port number, and the packet priority.

The FEC increases, in accordance with its strength, the redundancy data by around 10 or 20% relative to the data before adding the FEC information. This can be brought together with the original data as a single content group, but may be separated from the original data as another group. This makes it easy to separate the process, and perform monitoring and filtering in the network.

A packet of particularly high priority needs a total network band designed. Thus, the priority for only the original data may be increased and the priority for the FEC information may be decreased relatively, or in contrast, the priority for only the FEC information may be increased and the priority for the original data may be decreased relatively. This allows for efficient utilization of the finite high priority packets.

Eighth Embodiment

The system according to the present embodiment has an ARQ function for the multicast communication. The content request unit 204 in the MUC 104 has an ARQ unicast request function, and the content receiving cache unit 205 has an ARQ unicast receiving cache function. The content transmission unit 203 in the UMC 105 has a unicast transmission function.

The ARQ unicast request function is a function to transmit a unicast request to make a requisition for content using the unicast communication in a case that the multicast signal received from the UMC 105 is lost. The ARQ unicast receive cache function is a function to receive content from the UMC 105 in the unicast communication and cache the received content in the content receiving cache unit 205. The content transmission unit 203 in the UMC 105 may have the function to transmit content in unicast manner in the case of receiving a unicast request from the MUC 104.

In a case that the MUC 104 is in a state of waiting for the M-res.2 and a reception signal thereof is not complete, the cause thereof may be packet loss, reception error in the MUC 104, or the like, resulting in the signal loss in the MUC 104. At this time, the MUC 104 can complement this loss by reissuing the req.2 with a limitation to the unicast communication. This is an automatic repeat request (ARQ) in units of files. The ARQ in units of files is easier to implement than a ARQ in units of packets or blocks because the HTTP request scheme is available.

The scheme is possible because the present disclosure, unlike other multicast systems, performs a file-based multicast conversion based on an HTTP. A video file may be divided into files obtained by dividing a playback time thereof into pieces of a few seconds. In such a case, the retransmission process in units of files even maintains sufficient efficiency.

The present embodiment may make a division requisition in the ARQ for the multicast communication. For example, the content request unit 204 in the MUC 104 has a function to make a requisition for a portion of the content. In this case, the content receiving cache unit 205 has a multicast-unicast mix receiving cache function to receive the contents divided into the unicast communication portion and the multicast communication portion from the UMC 105, and restore the original content to cache. The content transmission unit 203 in the UMC 105 transmits content in unicast manner in the case of receiving a unicast request for a portion of content from the MUC 104.

The content request unit 204 is capable of the ARQ in units of packets and in units of blocks in which the content is divided into a plurality of blocks, without limitation to units of files. In this case, use of the HTTP request req.2 is not appropriate in terms of overhead. Therefore, the content request unit 204 preferably utilizes an ARQ message that is not a req.2.

The content request unit 204 may perform an ARQ using a NACK (nonarrival response acknowledgement) message.

This scheme is superior to the ARQ in units of files in response speed and band efficiency.

The system according to the present embodiment may perform ARQ in units of packets or in units of blocks. In this case, the packets for performing the ARQ or the blocks included in the content are numbered in an order, and determines whether there is a loss and makes a re-requisition in the numbered order. In addition, both the ARQ in units of file units and the ARQ in units of packets or blocks can be used.

Ninth Embodiment

The system according to the present embodiment includes a plurality of, two or more, UMCs 105, where all or some of the plurality of UMCs 105 operate as active systems, and in a case that a UMC 105 of the active system is failed or overloaded, all or some functions of the UMC 105 of the active system are substituted by a UMC 105 of another active system or standby systems.

Figure 5:
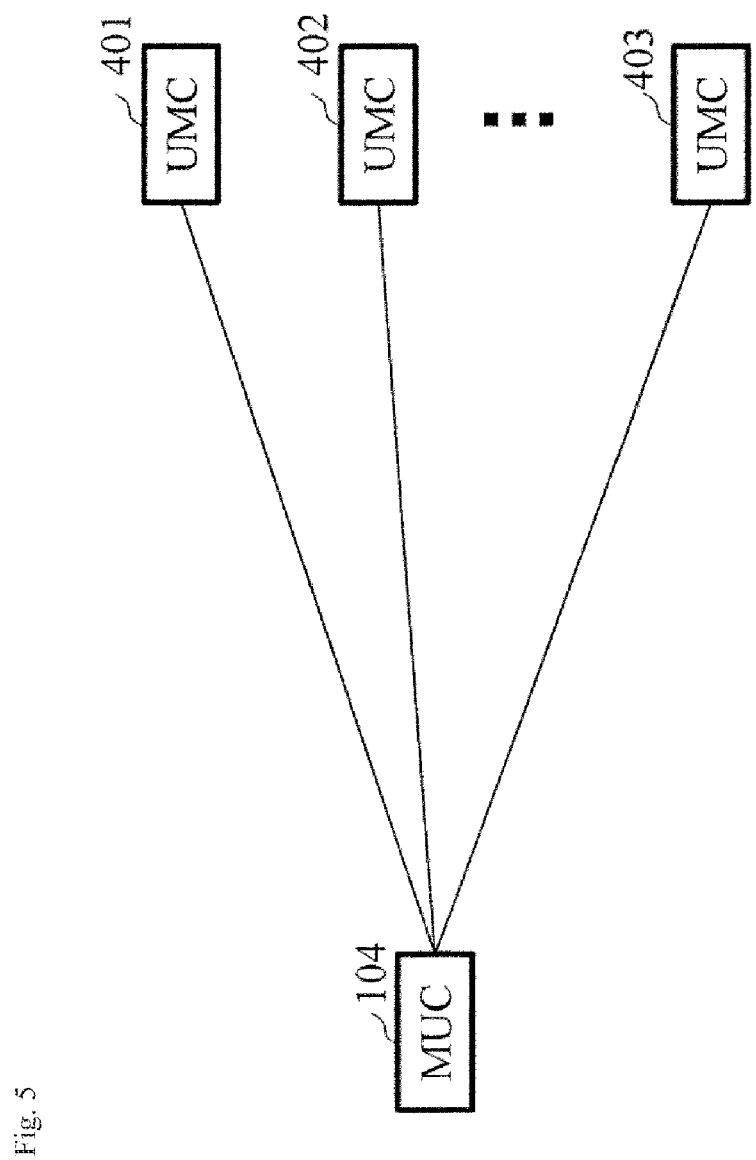
FIG. 5 is a schematic configuration diagram of a system according to a ninth embodiment.

FIG. 5 illustrates a configuration in which there are a plurality of UMCs 105. A plurality of UMCs corresponding to the UMCs 105 are denoted by 401, 402, and 403. When 401 and 402 represent the active systems and 403 represents the standby system, in a case that the UMC 401 is failed or overloaded, all or some functions of the UMC 401 may be taken over by the UMC 403.

The UMC 401 and the UMC 402 are load balancing systems, and for example, the connection destination from MUC 104 to the UMCs 401 and 402 can be switched for each content group.

The active system is also capable of fallback operations during failure. For example, when the UMC 401 is failed, the UMC 402 may be responsible for both the functions of the UMC 401 and the functions that the UMC 402 is responsible for before the UMC 401 is failed. For example, when the UMC 402 is overloaded, the UMC 402 may be responsible for the functions of processing of some content groups the UMC 401 is responsible for and the functions the UMC 402 is responsible for before the UMC 401 is overloaded.

Such functions not only allow for improved system operation ratio, but also allow the system to be replaced, expanded or otherwise transitioned without service outage.

Tenth Embodiment

Figure 6:
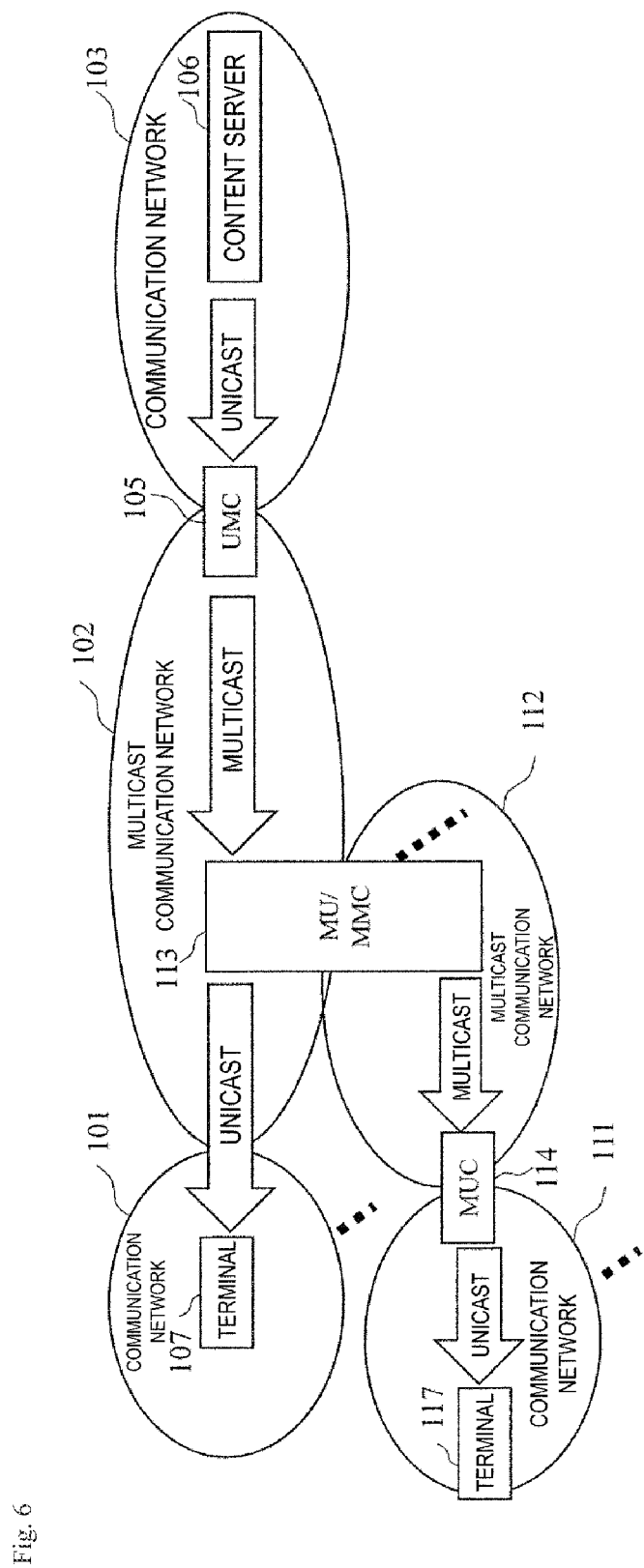
FIG. 6 illustrates an example of a system configuration according to a tenth embodiment.

FIG. 6 illustrates an example of a network configuration provided with a content delivery method according to the present embodiment. In the present embodiment, a multicast communication network 112, an MUC 114, a communication network 111, and a terminal 117 are provided in addition to the configuration of the first embodiment, and the MUC 104 of the first embodiment is replaced with a MU/MMC 113. The multicast communication network 102 functions as a first multicast communication network and the multicast communication network 112 functions as a second multicast communication network.

The terminal 117 functions as a first terminal and the terminal 107 functions as a second terminal. For the terminal 107, the MU/MMC 113 performs the same operation as the MUC 104 in the first embodiment. The multicast communication network 102 and the multicast communication network 112, which are networks capable of multicast communication, are provided between the content server 106 and the terminal 117. In FIG. 6, the network 101, the network 103, the multicast communication network 102, and the multicast communication network 112 are different networks, but some of these networks may be a single network.

The MU/MMC 113 is located at a boundary between the network 102 and the network 112 or at a boundary between the network 102, the network 101 and the network 112, and the MUC 114 is located at a boundary between the network 112 and the network 111 or in the network 112 or in the network 111.

Here, the MUC 114 basically converts the communication from multicast to unicast, but the communication before conversion may include or only be a unicast communication. While the MU/MMC 113 performs the function to basically convert the communication from multicast to unicast, the communication before conversion may include or only be a unicast communication. While the MU/MMC 113 performs the function to basically convert the communication from multicast to multicast again, the converted communication may include or only be a unicast communication. The UMC 105 basically converts the communication from unicast to multicast, but the converted communication may include or only be a unicast communication. In a case that the MUC 114, the MU/MMC 113, and the UMC 105 perform only the unicast communications, the system according to the present disclosure is substantially equivalent to a multi-stage web proxy system. The present disclosure is a system that adaptively converts into multicast a portion of communication (between the UMC 105, the MU/MMC 113, and the MUC 114) in a web proxy system (the UMC 105, the MU/MMC 113, and the MUC 114 in the present disclosure) that is the application layer.

Figure 7:
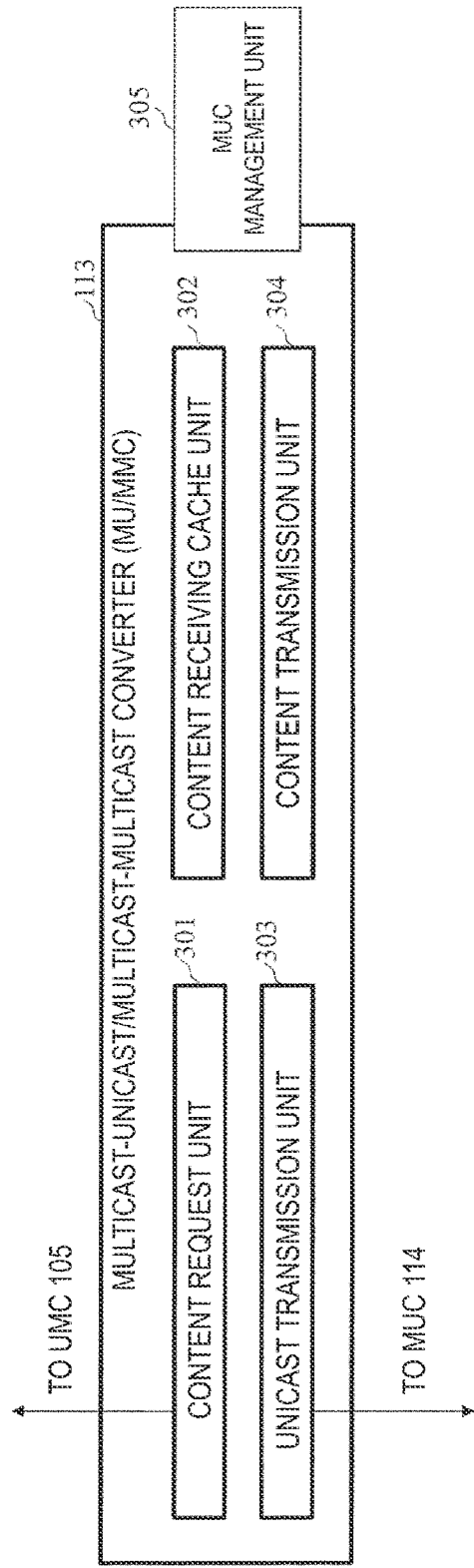
FIG. 7 illustrates an example of a function provided to a MU/MMC.

The delivery system of the present embodiment includes the MU/MMC 113 instead of the MUC 104. FIG. 7 illustrates an example of a function provided to the MU/MMC 113. The MU/MMC 113 includes a content request unit 301, a content receiving cache unit 302, a unicast transmission unit 303, and a content transmission unit 304.

The content request unit 301, the content receiving cache unit 302, and the unicast transmission unit 303 are similar to the content request unit 204, the content receiving cache unit 205, and the unicast transmission unit 206, respectively, included in the MUC 104. Thus, the MU/MMC 113 operates equivalently to the function of the MUC 104 and transmits content in the content server 106 to the terminal 107 in the unicast communication.

The content transmission unit 304 is similar to the content transmission unit 304 included in the UMC 105. Thus, when comparing between a case that the MUC 104 connects directly to the UMC 105 and a case that the MUC 114 connects to the MU/MMC 113, the operation of the communication between the MUC 104 and the UMC 105 is equivalent to the operation of the communication between the UC 114 and the MU/MMC 113.

Note that the present embodiment may have a configuration in which the communication network 101 and the terminal 107 are not provided.

The MU/MMC 113 is connected to the multicast communication network 112 that is different from the multicast communication network 102. An MUC management unit 305 manages all or some of network information of the multicast communication network 112, address information of the MUC 114, network information of the network 111, information related to the multicast communication used in the network 112, and information related to the content group identifier. The content transmission unit 304 refers to the network information stored in the MUC management unit 305 to transmit the content to the MUC 114 using a transmission interval or transmission rate or address or port number of the packet adapted to the network environment of the multicast communication network 112. As described above, each of the UMC 105 and the MU/MMC 113 according to the present embodiment has a function to independently control the transmission interval or transmission rate or address or port number of the packet.

Note that the function of independently controlling may include independently controlling another parameter associated with the network such as the packet priority, in addition to the transmission interval or transmission rate or address or port number of the packet.

The multicast communication network 112 and the network 111 to which the terminal 117 belongs often have a network environment different from the multicast communication network 101. For example, the computer resources of the MUC 114 in the communication network 111 to which the terminal 117 belongs are often less than those of the MU/MMC 113 in the multicast communication network 102. The MJ/MMC 113 is connected to a wired and high-speed network, whereas the MIC 114 may belong to a wireless or low-speed network.

To reduce the delivery delay, it is desirable to transmit packets at a higher speed. However, there may be a case that the multicast communication network 112 or the communication network 111 are incapable of transmission, or a case that the MUC 114 is incapable of reception even at a speed that the multicast communication network 102 is capable of transmission and the MU/MMC 113 is capable of reception. In such a case, in the present embodiment, the communication speed is controlled independently at a high speed by the UMC 105 and at a low speed by the MJ/MMC 113. Specifically, a conceivable speed adjustment scheme may include controlling the transmission interval of the transmission packet or controlling the transmission rate. Note that other schemes may be used to control the speed.

The communication network 111 and the multicast communication network 112 may differ in the available addresses, in particular, an available range of the multicast address and its source address in the multicast communication. For example, in a case that a passive optical network (PON) is used in a portion of the multicast communication network 112, the multicast communication available in the PON system may have the limited range or number of addresses or the like that can be handled. In this case, the MU/MMC 113 can change the multicast address used in the multicast communication network 112 to the address range available for the multicast communication network 112.

As a result, the present embodiment makes various terminal networks and multicast communication networks available, and makes various MUCs available in the multicast communication.

The present disclosure further provides the following effects.

Different files of the same video program can be transferred efficiently using the same multicast source address and group address.

Data can be transferred in the unicast packets to the MUC that cannot not receive the multicast packet for any reason.

Delivery to a plurality of multicast communication networks can be performed, and a large number of deliveries are possible including a delivery according to various different terminal environments and a delivery avoiding limited address utilization.

Eleventh Embodiment

In the present embodiment, the content transmission unit 203 included in the UMC 105 and the content transmission unit 304 included in the MU/MMC 113 illustrated in FIG. 6 have a function to control the packet transmission interval or the transmission rate for each content group.

An average transmission rate of the video content depends on video quality and the like. In the multicast communication, in terms of reducing delay, it is desirable that the average transmission rate be high. On the other hand, in terms of network load and multicast packet receiving devices, it is desirable that the average transmission rate be low. Therefore, in the present embodiment, the speed of the multicast communication is controlled for each content group.

Specifically, the MUC management unit 305 stores a transmission requirement for content linked to the content group identifier. The content transmission unit 304 refers to the MUC management unit 305, and controls the transmission interval or transmission rate of the packet for each content group.

For example, the content group of higher quality content or content with a strict delay requirement is transmitted at a high speed, and a content group of lower quality content or content with a looser delay requirement is transmitted at a low speed. This allows the load on the network or the device to be reduced while maintaining the transmission requirement for the content.

Note that the control described above may include controlling another parameter associated with the network such as the address or the port number or the packet priority, in addition to the transmission interval or transmission rate of the packet.

Twelfth Embodiment

In the present embodiment, the content transmission unit 304 included in the MU/MMC 113 individually controls the plurality of MUCs 114 by matching the transmission interval or transmission rate or address or port number of the packet with the reception capability or limitation of the corresponding MUC 114 of a transmission destination.

One content group is not necessarily for a single multicast communication. In other words, a plurality of multicast communications from the MU/MMC 113 to the MUC 114 may be performed for one content group. At this time, each multicast communication may control the transmission interval or transmission rate or address or port of the packet for each MUC 114 depending on the reception capability or limitation of the corresponding MUC 114. Multicast communication may be performed collectively for the MUCs 114 equivalent in features.

Figure 8:
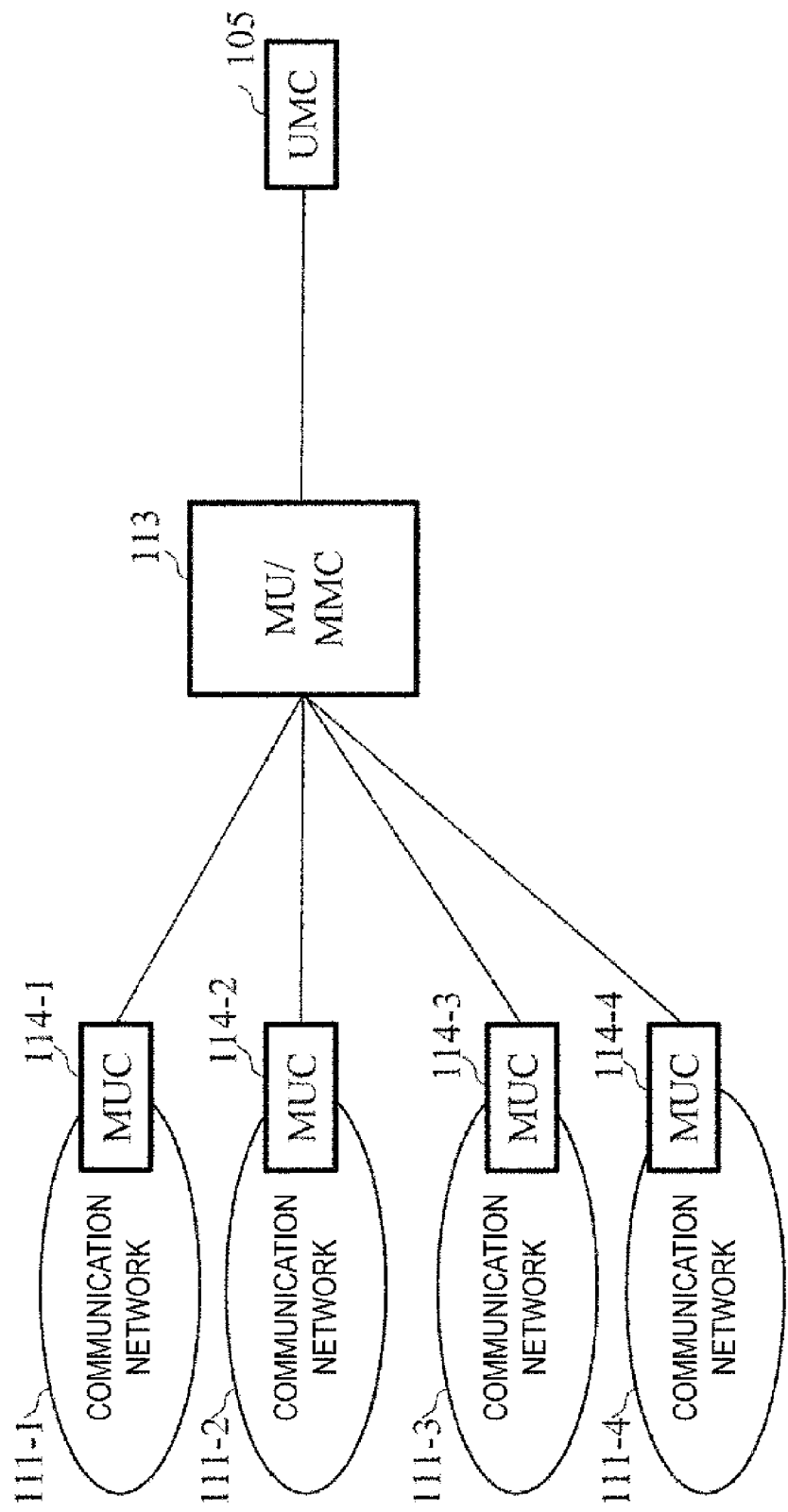
FIG. 8 illustrates an example of a schematic configuration of a system according to a twelfth embodiment.

For example, assume a case that the MUCs 114-1 to 114-4 are connected to the MU/MMC 113, as illustrated in FIG. 8. The MUCs 114-1 and 114-2 are connected to wired communication networks 111-1 and 111-2 connected at 1000 Mbps, respectively. The MUC 114-3 is connected to a wired communication network 111-3 connected at 100 Mbps. The MUC 114-4 is connected to a wireless communication network 111-4 connected at 54 Mbps. In this case, individual separate multicast communications may be assumed in which one content is sent momentarily at 300 Mbps to the MUCs 114-1 and 114-2, meanwhile, is sent momentarily at 80 Mbps to the MUC 114-3, and momentarily at 30 Mbps to the MUC 114-4.

In this case, the address (multicast group address, source address) or port number used for the multicast communication may be controlled to be different for each multicast communication. Note that the use of the same address is not excluded.

Note that the individual control described above may include controlling another parameter associated with the network such as the packet priority, in addition to the transmission interval or transmission rate or address or port number of the packet.

This makes it possible to transmit the content to the MUCs 114-1, 114-2, and 114-3 at the higher speed or with a lower latency than to the MUC 114-4. If the delay requirement for the content is not satisfied in the MUC 114-4, only the MUC 114-4 may cause degradation of the video, but the MUCs 114-1, 114-2, and 114-3 allow for stable watching. At this time, the multicast communications for the first and second MUCs 114-1 and 114-2, and for the MUC 114-3 may be the same multicast communication.

Thirteenth Embodiment

The content transmission unit 304 included in the MU/MMC 113 controls the transmission interval or transmission rate or address or port number of the packet by reporting the reception capability or transmission interval or transmission rate or address or port number of the multicast packet to the MU/MMC 113, to which the MUC 114 makes a request, when the MU/MMC 113 controls the transmission interval or transmission rate or address of the packet for each content described in the eleventh embodiment.

It is difficult for the MU/MMC 113 to directly know the speed of the multicast communication at which the MUC 114 is capable of reception. Then, the MUC 114 may report, to the MU/MMC 113, the speed, transmission interval, or transmission rate or address to which the MUC 114 is adaptable, and the MU/MMC 113 may control the transmission interval or transmission rate or address of the packet in the content transmission unit 304 based on the reporting.

An upper limit of the speed at which the MUC 114 is capable of reception may be set in the MUC 114 itself in advance, or the MUC 114 may automatically set the upper limit of the speed at which the MUC 114 is capable of reception, depending on a speed of the connected circuit, or the like.

Note that the control described above may include controlling another parameter associated with the network such as the packet priority, in addition to the transmission interval or transmission rate or address or port number of the packet.

Note that a parameter such as the receivable speed may be included in the content request in the reporting from the MUC 114. In this way, content is transmitted to the terminal 117 with the higher capability at the higher speed or with the low delay depending on the reception capability to receive to allow for stable watching.

Fourteenth Embodiment

The content transmission unit 304 included in the MU/MMC 113 controls the transmission interval or transmission rate or address or port number of the packet depending on a frequency of the request by the unicast request function in response to the loss of the multicast signal when the MU/MMC 113 controls the transmission interval or transmission rate or address of the packet for each content described in the eleventh embodiment.

Note that the control described above may include controlling another parameter associated with the network such as the packet priority, in addition to the transmission interval or transmission rate or address or port number of the packet.

In this system may, the MU/MMC 113 may also perform unicast retransmission to the MUC 114 in the case that a loss occurs in the multicast packet. Thus, monitoring the frequency of transmissions from the MU/MMC 113 to the MUC 114 allows the MU/MMC 113 to indirectly grasp the reception capacity of the MUC 114.

In this way, content is transmitted to the terminal 117 with the higher capability at the higher speed or with the low delay depending on the reception capability to receive to allow for stable watching.

Fifteenth Embodiment

By changing a location of content described in the manifest file from the content server 106 to the MU/MMC 113, a request from the terminal 117 to the MUC 114 may be processed such that the request is made from the terminal 117 to the MUC 114, and the MU/MMC 113 redirects, to the MUC 114, the request from the terminal 117 to the MU/MMC 113.

Figure 9:
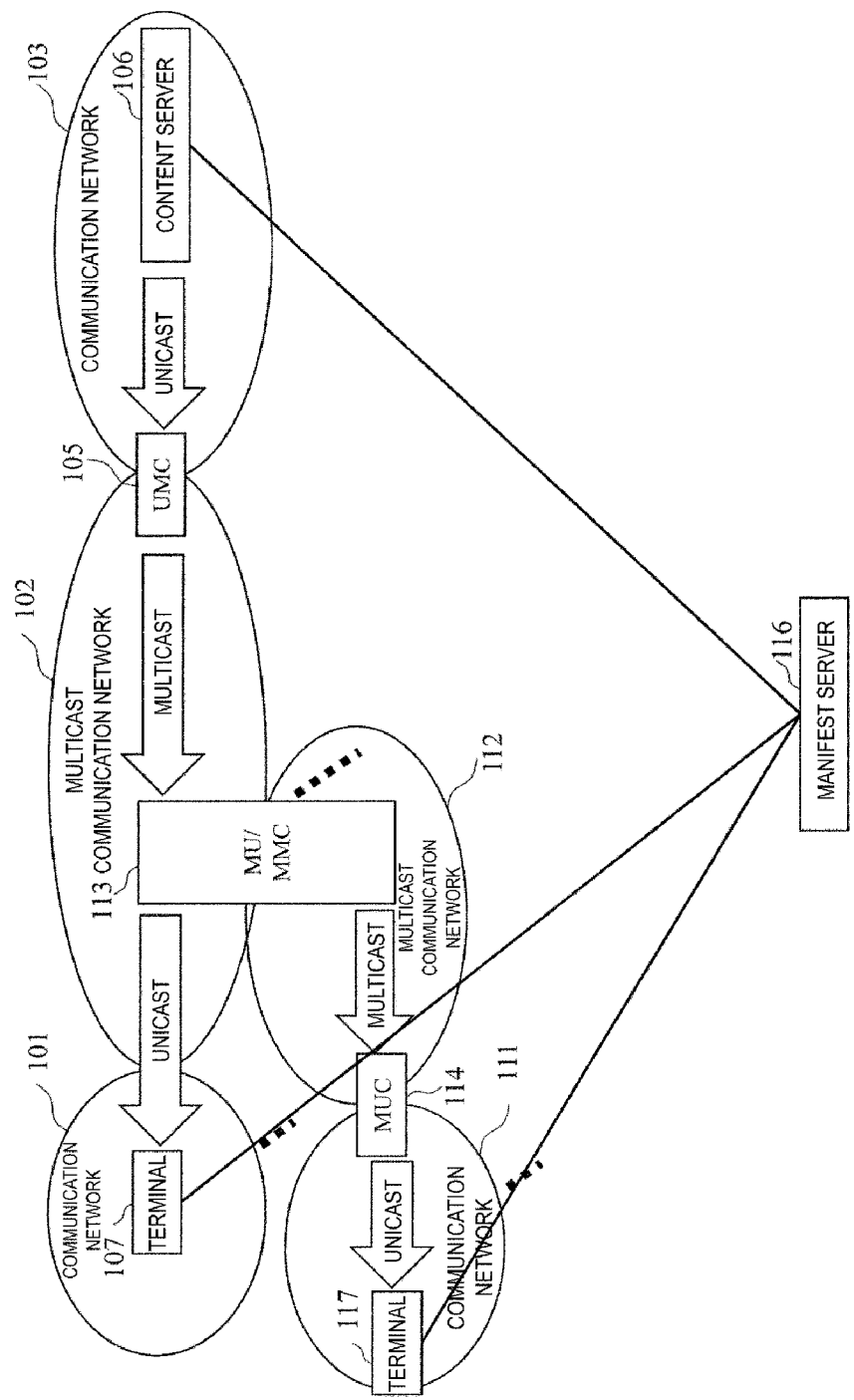
FIG. 9 illustrates an example of a system configuration according to a fifteenth embodiment.

FIG. 9 illustrates an example of a network configuration provided with a content delivery method according to the present embodiment. In the present embodiment, a manifest server 116 that controls the MUC 114, the MU/MMC 113, and the UMC 105 is provided. The manifest server 116 is provided in a network that is capable of communicating with the content server 106 or capable of communicating with the terminal 107 or the terminal 117, or is implemented as a function of the content server 106 or UMC 105 or MU/MMC 113.

The manifest server is a server having a manifest file disposed thereon. The manifest file is a file indicating a video file to be acquired by the terminal 107 or 117, or a URL thereof, from one video content including a plurality of files, in other words, a content group.

For example, when one content group includes video files including http//www.example.org/contents1/streams0001.ts, http//www.example.org/contents1/streams0002.ts, . . . , and http//www.example.org/contents1/streamsxxxx.ts, a file in which information indicating http//www.example.org/contents1/streams0001.ts, http//www.example.org/contents1/streams0002.ts, . . . , and http//www.example.org/contents1/streamsxxxx.ts is described, is referred to as a manifest file.

In acquiring and reproducing an HTTP video content, such a way is used that the terminal 107 or 117 acquires the manifest file, and then, acquires the content file in accordance with the description of the manifest file. Note that, while acquiring a plurality of content files, in a case that the content file such as a live video is generated in real time, the manifest file, content of which is assumed to be updated, may be periodically re-acquired.

In the present embodiment, such a way can be used that the manifest server 116 obtains an original manifest file held by the content server 106, rewrites the URL of the content file from the content server 106 to the MU/MMC 113, and provides the resultant manifest file to the terminal 107 and the terminal 117.

Figure 10:
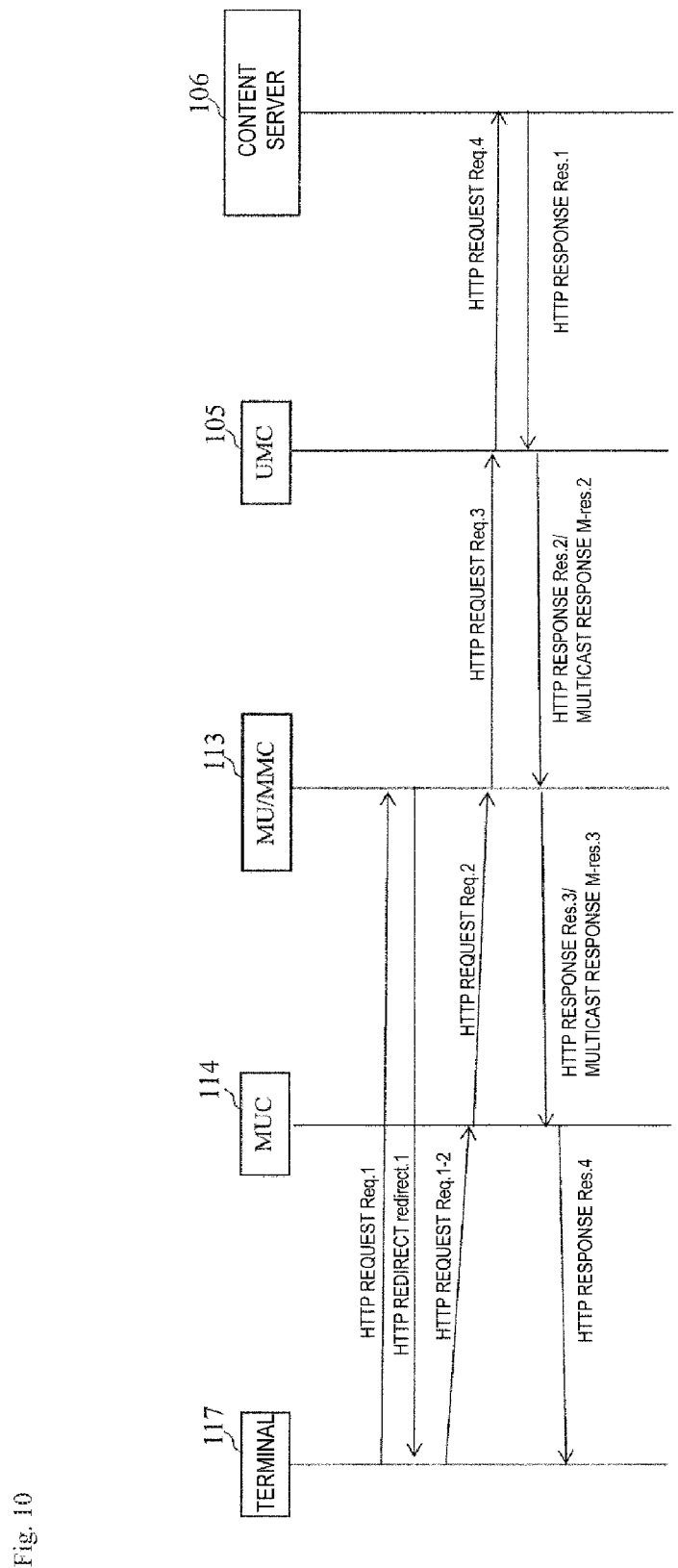
FIG. 10 illustrates a sequence according to the fifteenth embodiment.

FIG. 10 illustrates an example sequence of acquiring the content file in the case that the MUC 114, the MU/MMC 113, and the UMC 105 have no cache. The terminal 117 makes an HTTP request req.1 for the content file to the MU/MMC 113 in accordance with the description of the manifest file. The MU/MMC 113 refers to the network information stored in the MUC management unit 305 to determine that the terminal 117 can utilize the MUC 114 corresponding to the terminal 117, and makes an HTTP redirect redirect.1. Note that, in a case of the terminal 107, it is determined that there is no available MUC, and the redirect is not made.

The terminal 117 makes an HTTP request req.1-2 to the MUC 114 in response to the redirect. In a case that the MUC 114 has no cache, the MUC 114 makes a req.2 to the MU/MMC 113. In the case that the MU/MMC 113 has no cache, the MU/MMC 113 makes a req.3 to the UMC 105. In the case that the UMC 105 has no cache, the UMC 105 makes a req.4 to the content server 106.

The content server 106 makes an HTTP response res.1 in response to the req.4. The UMC 105 makes an HTTP response res.2 or a multicast response M-res. 2 in response to the req.3. The MU/MMC 113 makes an HTTP response res.3 or a multicast response M-res.3 in response to the req.2. The MUC 114 makes an HTTP response res.4 in response to the req.1-2.

By redirecting in two stages in this manner, the manifest server 116 is only required to manage the address or hostname of the MU/MMC 113, and the MC/MMC 113 is also only required to manage the accommodating MUC 114, which enables a high scalable system to be constructed.

Sixteenth Embodiment

A request from the terminal 117 to the MUC 114 may be processed such that the content server 106 redirects, to the MU/MMC 113, the request from the terminal 117 to the content server 106, and the MU/MMC 113 redirects, to the MUC 114, the request from the terminal 117 to the MU/MMC 113.

Figure 11:
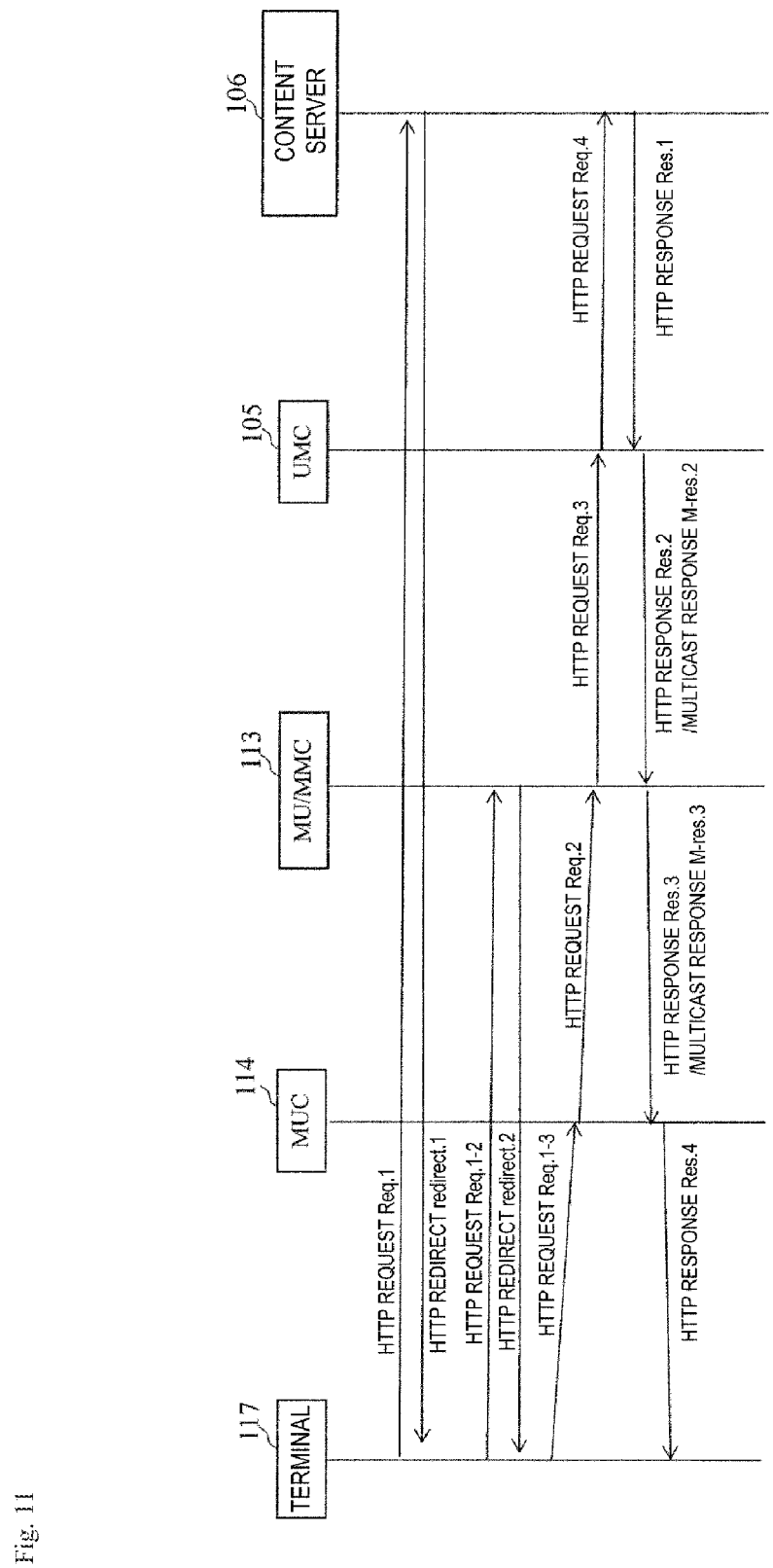
FIG. 11 illustrates a sequence according to a sixteenth embodiment.

FIG. 11 illustrates an example sequence in the case that the MUC 114, the MU/MMC 113, and the UMC 105 have no cache. The terminal 117 makes an HTTP request req.1 for the content file to the content server 106 in accordance with the description of the manifest file. The content server 106 determines that the terminal 117 can utilize the MU/MMC 113 corresponding to the terminal 117, and makes an HTTP redirect redirect.1.

The terminal 117 makes an HTTP request req.1-2 to the MU/MMC 113 in response to the redirect. The MU/MMC 113 determines that the terminal 117 can utilize the MUC 114 corresponding to the terminal 117, and makes an HTTP redirect redirect.2. Note that, in the case of the terminal 107, it is determined that there is no available MUC, and the redirect is not made.

The terminal 117 makes an HTTP request req.1-3 to the MUC 114 in response to the redirect.

In the case that the MUC 114 has no cache, the MUC 114 makes a req.2 to the MU/MMC 113. In the case that the MU/MMC 113 has no cache, the MU/MMC 113 makes a req.3 to the UMC 105. In the case that the UMC 105 has no cache, the UMC 105 makes a req.4 to the content server 106. The content server 106 makes an HTTP response res.1 in response to the req.4. The UMC 105 makes an HTTP response res.2 or a multicast response M-res. 2 in response to the req.3. The MU/MMC 113 makes an HTTP response res.3 or a multicast response M-res.3 in response to the req.2. The MUC 114 makes an HTTP response res.4 in response to the req.1-2.

By redirecting in two stages in this manner, the content server 106 is only required to manage the address or hostname of the MU/MMC 113, and the MU/MMC 113 is also only required to manage the accommodating MUC 114, which enables a high scalable system to be constructed.

Seventeenth Embodiment

Figure 12:
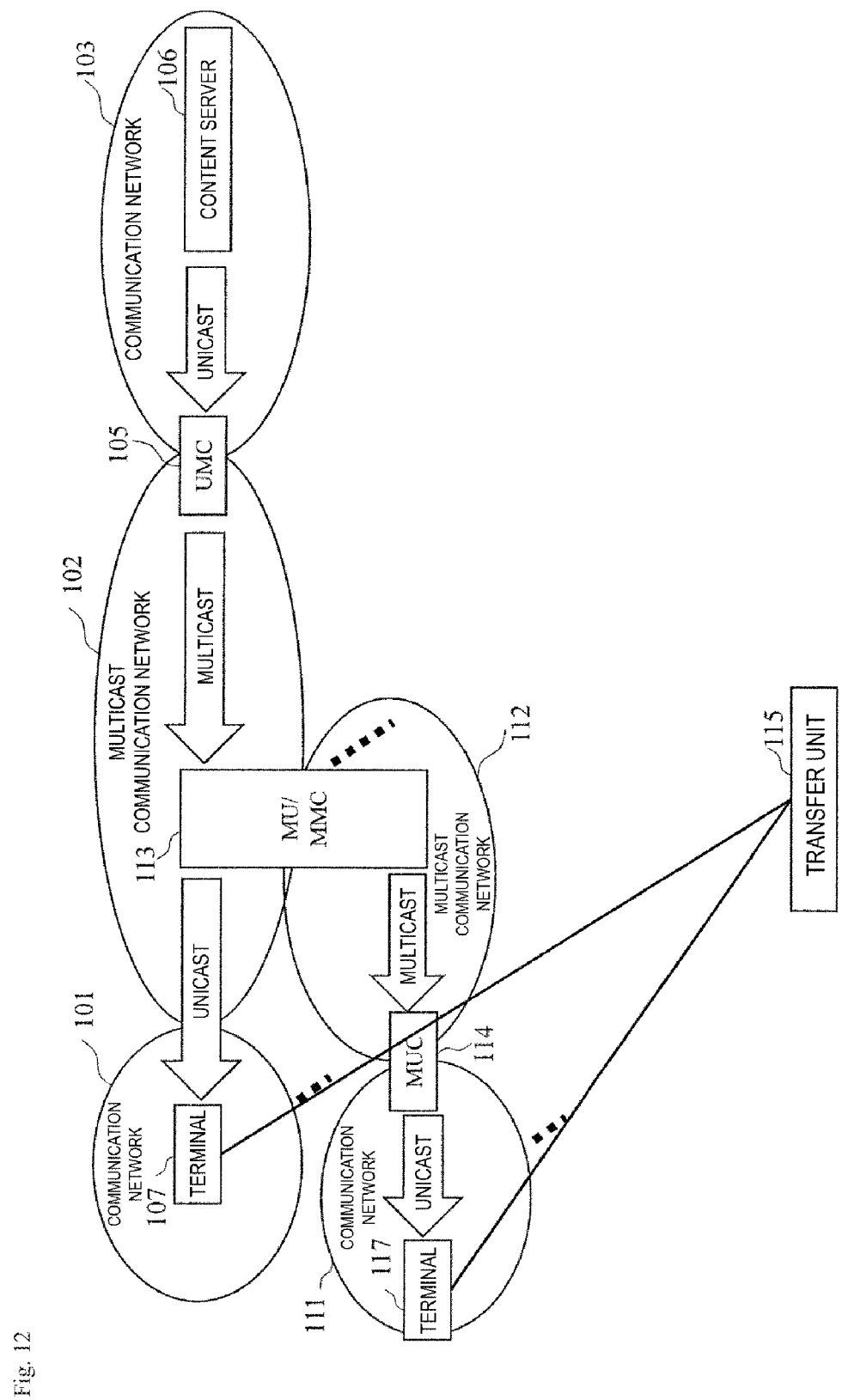
FIG. 12 illustrates an example of a system configuration according to a seventeenth embodiment.

FIG. 12 illustrates an example of a network configuration provided with a content delivery method according to the present embodiment. The content delivery system according to the present embodiment includes a transfer unit 115. In the content delivery system according to the present embodiment, the content server 106 redirects, to the transfer unit 115, a request from the terminal 117 to the content server 106. The transfer unit 115 redirects, to the MU/MMC 113, the request from the terminal 117 to the transfer unit 115. The MU/MMC 113 redirects, to the MUC 114, the request from the terminal 117 to the MU/MMC 113. In this manner, the present embodiment makes a request from the terminal 117 to the MUC 114.

Here, the transfer unit 115 is provided in a network that is capable of communicating with the terminal 107 or the terminal 117, or is implemented as a function of the UMC 105 or MU/MMC 113.

Figure 13:
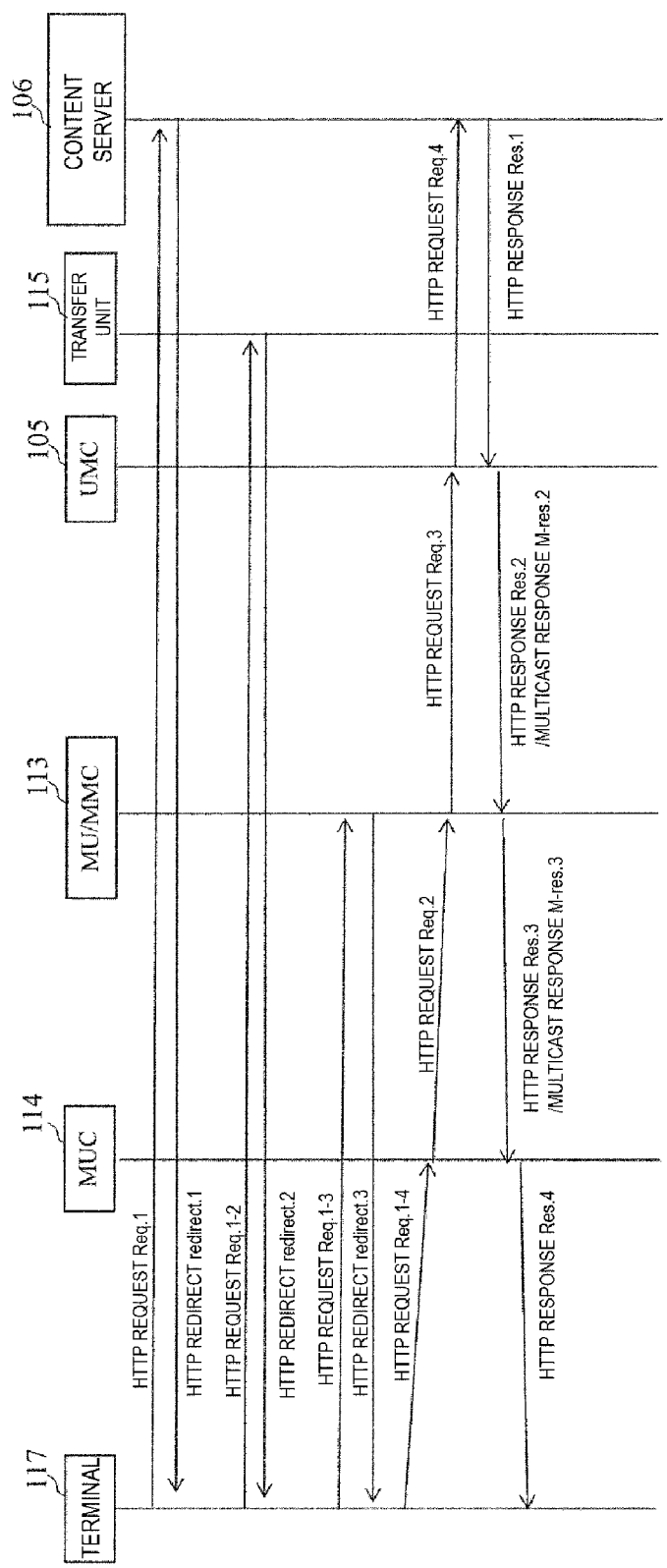
FIG. 13 illustrates a sequence according to the seventeenth embodiment.

FIG. 13 illustrates an example sequence in the case that the MUC 114, the MU/MMC 113, and the UMC 105 have no cache.

The terminal 117 makes an HTTP request req.1 for the content file to the content server 106 in accordance with the description of the manifest file. The content server 106 determines that the terminal 117 can utilize this unicast-multicast interconversion system, and makes an HTTP redirect redirect.1. The terminal 117 makes an HTTP request req.1-2 to the transfer unit 115 in response to the redirect.

The transfer unit 115 determines that the terminal 117 can utilize the MUC 114 corresponding to the terminal 117, and makes an HTTP redirect redirect.2. The terminal 117 makes an HTTP request req.1-3 to the MU/MMC 113 in response to the redirect. The MU/MMC 113 determines that the terminal 117 can utilize the MUC corresponding to the terminal 117, and makes an HTTP redirect redirect.3. Note that, in the case of the terminal 107, it is determined that there is no available MUC, and the redirect is not made.

The terminal 117 makes an HTTP request req.1-4 to the MUC 114 in response to the redirect. In the case that the MUC 114 has no cache, the MUC 114 makes a req.2 to the MU/MMC 113. In the case that the MU/MMC 113 has no cache, the MU/MMC 113 makes a req.3 to the UMC 105. In the case that the UMC 105 has no cache, the UMC 105 makes a req.4 to the content server 106.

The content server 106 makes an HTTP response res.1 in response to the req.4. The UMC 105 makes an HTTP response res.2 or a multicast response M-res. 2 in response to the req.3. The MU/MMC 113 makes an HTTP response res.3 or a multicast response M-res.3 in response to the req.2. The MUC 114 makes an HTTP response res.4 in response to the req.1-2.

By redirecting in three stages in this manner, the content server 106 is only required to manage the address or hostname of the transfer unit 115, the transfer unit 115 is also only required to manage the address or hostname of the MU/MMC 113 further, and the MU/MMC 113 is also only required to manage the accommodating MUC, which enables a high scalable system to be constructed.

Note that the transfer combined with the transfer by the manifest server 116 of the above-described embodiment may be performed.

It may be possible that the content server 106 does not determine that the terminal 117 can utilize this unicast-multicast interconversion system, but makes the HTTP redirect redirect.1, and instead, the transfer unit 115 determines that the terminal 117 can utilize the unicast-multicast interconversion system, and, if not, makes the HTTP redirection to the content server 106 again, where the content server 106 may, in the case of the request from the terminal 117 caused by redirecting from the transfer unit 115, send the content as the HTTP response without redirecting.

Here, a managing entity of the content server 106 may be different from a managing entity of the MU/MMC 113. In other words, it may be difficult to specify the address or the hostname of the MU/MMC 113 directly from the content server 106. In such a case, transferring via the transfer unit 115 managed by the managing entity of the MU/MMC 113 can simplify the management of the address and the hostname. Note that it is assumed that the transfer unit 115 constitutes only a single or redundant system, and a plurality of MU/MMCs 113 are present for each region.

Eighteenth Embodiment

In the content delivery system according to the present embodiment, the MUC management unit 305 may manage some or all of alive monitoring information and load information of the MUC 114, and network information such as an address and a net mask of the MUC 114, and network information such as an address and a net mask of the terminal 117 to which the MUC 114 transmits content in the unicast communication. The MUC management unit 305 may have a function to notify the manifest server 116, the content server 106, the MU/MMC 113, the MUC 114, or the transfer unit 115 of some or all of the information pieces described above.

Figure 14:
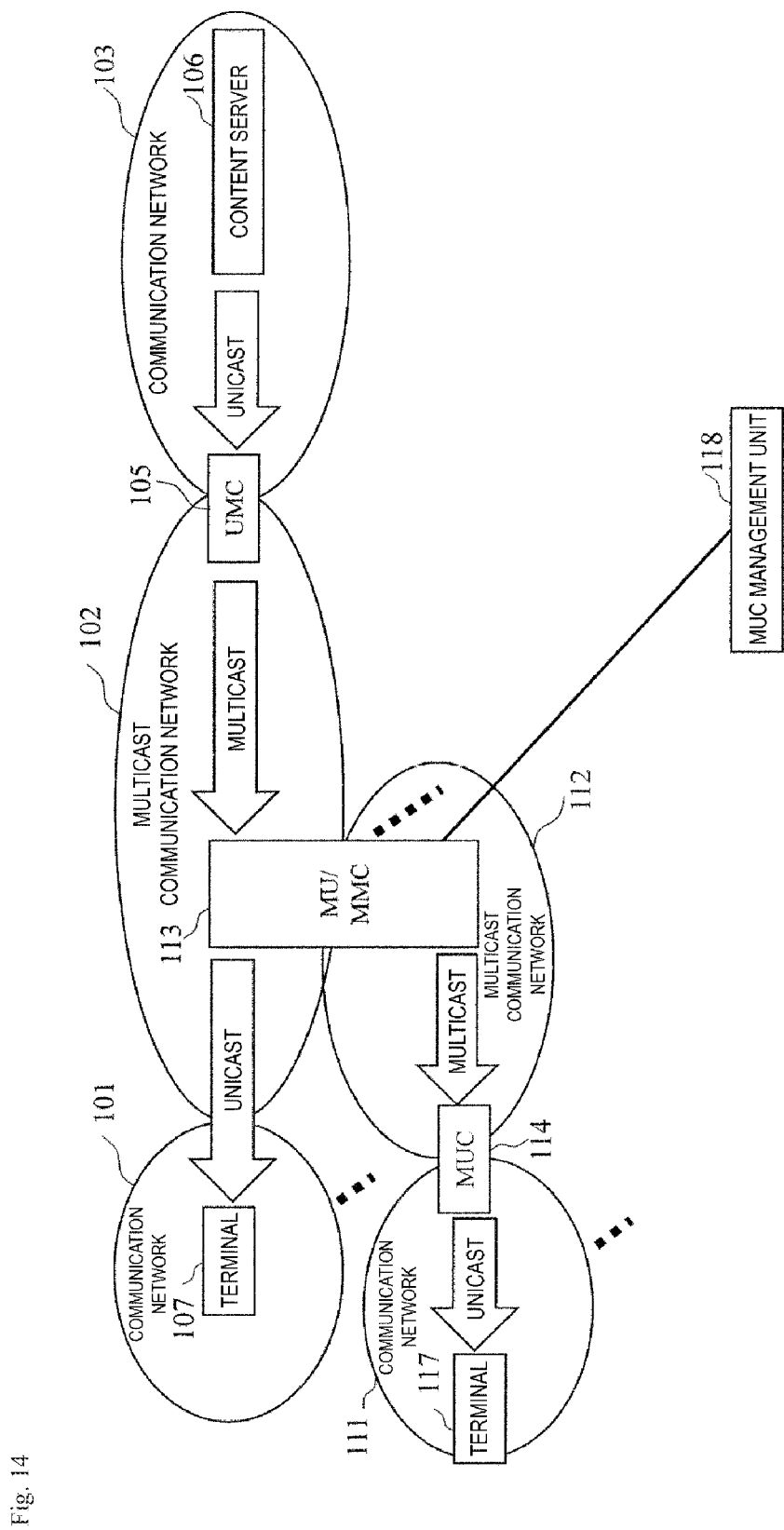
FIG. 14 illustrates an example of a system configuration according to an eighteenth embodiment.

As illustrated in FIG. 14, the MUC management unit 305 may be installed separately from the MU/MMC 113. The MUC management unit 305 when installed outside is referred to as an MUC management unit 118.

As a redirecting entity to the MUC 114, the manifest server 116, the MU/MMC 113, the content server 106, the transfer unit 115, and the like are considered, but the redirecting entity does not necessarily need to manage the information of a transfer destination. Separately from the MU/MMC 113, the content server 106, and the transfer unit 115, the MUC management unit 118 may be provided to perform intensive management.

Note that the information of the transfer destination is alive monitoring information and load information of the MUC 114, and network information such as an address and a net mask of the MUC 114, and network information such as an address and a net mask of the terminal 117 to which the MUC 114 transmits content in the unicast communication, and information of the MU/MMC 113 to which the MUC 114 is to transmit a request.

The MUC management unit 305 or the MUC management unit 118 directly or indirectly performs alive monitoring and load monitoring of the MUC 114, and in a case of an abnormal condition, determines not to perform transferring. The transferring is performed by maintaining the network information such as the address of the MUC 114 itself. Required is information management of the terminal 117 which the MUC 114 accommodates in order to determine the MUC 114 when redirecting the request from the terminal 117, that is, to which the MUC 114 transmits content in the unicast communication. For example, the requisition from the terminal 117 at the address of 192.168.1.0/24 utilizes the information that a redirect is made to the MUC at 192.168.1.100. Network information of the MU/MMC 113 to which the MUC 114 is to transfer content may also be maintained and may be notified to the MUC 114.

These notifications may be notifications from the redirecting entity in a manner to respond to a query to the MUC management unit 118. By separating the MUC management unit 118 from the redirecting entity in this manner, it is possible to perform a strong redirect against the abnormal conditions such as failure of the redirecting entity.

As described above, the function of the MUC management unit 118 may be included in the MUC 113, the MU/MMC 113, the transfer unit 115, the content server 106, or the manifest server 116.

Nineteenth Embodiment

The redirecting to the MUC 114 or the changing the manifest may be processed such that the application targets are only some contents, and other contents than the former some contents are not the application targets. In this case, the MU/MMC 113 may not transmit the content to the terminal 117 in the unicast communication, or may not make a redirect to the MUC 114.

The number of terminals 117 accommodated by in a particular MU/MMC 113 is limited less than the number of terminals accommodated by UMC 105. As a result, the effect of reducing the amount of communication in the multicast communication may be limited in some cases. Additionally, the MU/MMC 113 sometimes cannot perform multicast communication due to the limitation of the multicast communication. In other words, the cases may be considered, where even if it is appropriate to use multicast communication from the UMC 105 to the MU/MMC 113, the use of multicast communication from the MU/MMC 113 to the MUC 114 may not be effective, or the multicast communication itself is not possible.

Thus, the present embodiment, in the communication from the MU/MMC 113 to the MUC 114, only some of contents, which are mainly real time contents many watch under the same MU/MMC 113, are transferred in the multicast communication, and other of the contents are transferred in the unicast communication. Specifically, for some contents, only the Res.3 is assumed to be used without assuming the M-res.3 in FIGS. 10, 11, and 13.

To reduce the requests and the responses, it is also possible to determine, before redirecting from the MU/MMC 113 to the MUC 114, whether the multicast communication from the MU/MMC 113 to the MUC 114 is appropriate, and if not, the MU/MMC 113 can send content as a response directly to the terminal 117 without redirecting.

Twentieth Embodiment

The system according to the present embodiment has a multicast request function to make a requisition for content to the UMC 105, when being triggered by a request from the terminal 117 to the MU/MMC 113, regardless of whether the MU/MMC 113 makes a redirect to the MUC 114 in the case of no content in the cache corresponding to the request.

Figure 15:
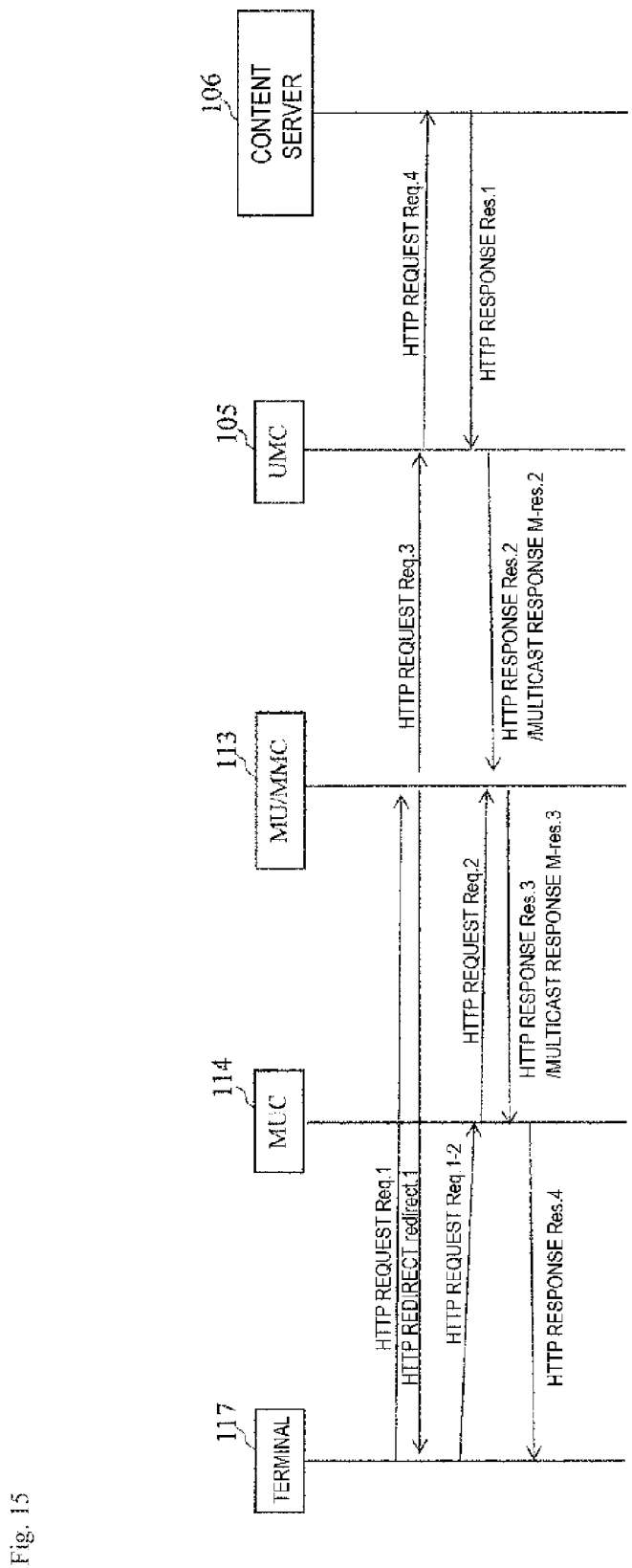
FIG. 15 illustrates a sequence according to a twentieth embodiment.

FIG. 15 illustrates an example sequence in the case that the MUC 114, the MU/MMC 113, and the UMC 105 have no cache, and after a request for a content file to the MU/MMC 113 is induced to be made.

The terminal 117 makes an HTTP request req.1 to the MU/MMC 113. The MU/MMC 113 determines that the terminal 117 can utilize the MUC 114 corresponding to the terminal 117, and makes an HTTP redirect redirect.1, and in the case that the MU/MMC 113 has no cache, the MU/MMC 113 makes an HTTP redirect redirect.3 to the UMC 105. This causes the UMC 105 to make a req.4 to the content server in the case that the UMC 105 has no cache.

The content server 106 makes an HTTP response res.1 in response to the req.4. The UMC 105 makes an HTTP response res.2 or a multicast response M-res. 2 in response to the req.3, and then, the cache is generated in the MU/MMC 113. On the other hand, the terminal 117 makes an HTTP request req.1-2 to the MUC 114 in response to the redirect redirect.1. In the case that the MUC 114 has no cache, the MUC 114 makes a req.2 to the MU/MMC 113. After the cache of the content is generated in the MU/MMC 113, the MU/MMC 113 makes an HTTP response res.3 or a multicast response M-res.3 in response to the req.2. The MUC makes an HTTP response res.4 in response to the req.1-2.

In this way, the MU/MMC 113 requests content to the UMC 105 when being triggered by the req.1, and thus, a response delay of the res.4 can be shortened compared to requesting content to the UMC 105 when being triggered by the req.2. This allows for more stably watching the high image quality video.

The device according to the present disclosure can be implemented using a computer and a program, and the program can be recorded in a recording medium or provided through a network.

INDUSTRIAL APPLICABILITY

The present disclosure can be applied in the information communication industry.

REFERENCE SIGNS LIST 101, 103: Network
102: Multicast communication network
104, 114: MUC
105: UMC
106: Content server
107, 117: Terminal
201: Unicast request unit
202: Unicast receiving cache unit
203, 304: Content transmission unit
204, 301: Content request unit
205, 302: Content receiving cache unit
206, 303: Unicast transmission unit
305: MUC management unit
113: MU/MMC
115: Transfer unit
116: Manifest server
118: MUC management unit

The invention claimed is:

1. A content delivery system in which a terminal and a content server are connected through an intermediate section using a multicast communication network in a unicast communication web delivery system, the content delivery system comprising:

a unicast-multicast converting apparatus includes a computer processor and a storage medium having first computer-executable instructions executed by the computer processor, wherein the first instructions perform to convert a communication from a unicast communication to a multicast communication to send the communication to a first multicast communication network for transmitting a multicast communication;

a multicast-unicast/multicast-multicast converting apparatus includes a computer processor and a storage medium having second computer-executable instructions executed by the computer processor, wherein the second instructions perform to send to a second multicast communication network for transmitting, again in multicast communication, the communication transmitted in a multicast manner in the first multicast communication network; and a multicast-unicast converting apparatus includes a computer processor and a storage medium having third computer-executable instructions executed by the computer processor, wherein the third instructions perform to convert the communication transmitted in the multicast manner in the second multicast communication network to a unicast communication, wherein the third instructions of the multicast-unicast converting apparatus includes perform to:

a first content receiving cache unit configured to identify content groups each including a plurality of contents grouped, receive content transmitted using either one or both of unicast communication and multicast communication schemes for each of the content groups from the second multicast communication network, and store the content included in the content group, a unicast transmission unit configured to transmit content in unicast communication from the first content receiving cache unit included in the multicast-unicast converting apparatus in response to a request from a first terminal connected through the second multicast communication network, and a first content request unit configured to selectively make, in a case that content corresponding to the request from the first terminal is not stored in the first content receiving cache unit, a requisition for a content group including the content corresponding to the request, using either one or both of unicast communication and multicast communication schemes, the second instructions of the multicast-unicast/multicast-multicast converting apparatus perform as:

a second content receiving cache unit configured to-identify the content group, receive content transmitted using either one or both of unicast communication and multicast communication schemes for each of the content groups from the first multicast communication network, and store the content included in the content group, a unicast transmission unit configured to transmit content from the second content receiving cache unit included in the multicast-unicast/multicast-multicast converting apparatus in unicast communication in response to the request from the first terminal, a first content transmission unit configured to transmit content from the second content receiving cache unit included in the multicast-unicast/multicast-multicast converting apparatus using either one or both of unicast communication and multicast communication schemes for each of the content groups in response to a request from the multicast-unicast converting apparatus, and a second content request unit configured to selectively make, in a case that content corresponding to the request from the first terminal or the multicast-unicast converting apparatus is not stored in the second content receiving cache unit, a requisition for a content group including the content corresponding to the request using either one or both of unicast communication and multicast communication schemes, and the first instructions of the unicast-multicast converting apparatus perform to:

a unicast receiving cache unit configured to receive content in unicast communication from the content server and store the content, a second content transmission unit configured to read, from the unicast receiving cache unit, a content group corresponding to the request from the multicast-unicast converting apparatus or the multicast-unicast/multicast-multicast converting apparatus, and transmit the read content group to the first multicast communication network using either one or both of unicast communication and multicast communication schemes, and a unicast request unit configured to make, in a case that the content group corresponding to the request from the multicast-unicast converting apparatus or the multicast-unicast/multicast-multicast converting apparatus is not stored in the unicast receiving cache unit, a requisition to the content server for the content group corresponding to the request from the multicast-unicast converting apparatus or the multicast-unicast/multicast-multicast converting apparatus in unicast communication.

2. The content delivery system according to claim 1, wherein
the second instructions of the multicast-unicast/multicast-multicast converting apparatus further perform to:
a unicast transmission unit configured to transmit content from the second content receiving cache unit included in the multicast-unicast/multicast-multicast converting apparatus in unicast communication in response to a request from a second terminal connected through the first multicast communication network, and
the second content request unit configured to selectively make, in a case that the content corresponding to the request from the second terminal is not stored in the second content receiving cache unit, a requisition for a content group including the content corresponding to the request using either one or both of unicast communication and multicast communication schemes.

3. The content delivery system according to claim 1, wherein
the first content request unit included in the multicast-unicast converting apparatus determines whether the content corresponding to the request from the first terminal is content for multicast, and in a case of not for multicast, makes a requisition for content in unicast communication to the multicast-unicast/multicast-multicast converting apparatus,
the second content request unit included in the multicast-unicast/multicast-multicast converting apparatus determines whether content corresponding to a request from the first content request unit is content for multicast, and in a case of not for multicast, makes a requisition for content in unicast communication to the unicast-multicast converting apparatus,
the first content transmission unit included in the multicast-unicast/multicast-multicast converting apparatus transmits, in a case of receiving a requisition for content in unicast communication from the multicast-unicast converting apparatus, content corresponding to the request in unicast communication to the multicast-unicast converting apparatus, and
the second content transmission unit included in the unicast-multicast converting apparatus transmits, in a case of receiving a requisition for content in unicast communication from the multicast-unicast/multicast-multicast converting apparatus, content corresponding to the request in unicast communication to the multicast-unicast/multicast-multicast converting apparatus.

4. The content delivery system according to claim 1, wherein the first content request unit included in the multicast-unicast converting apparatus determines whether the multicast-unicast converting apparatus belongs to a multicast group corresponding to the content corresponding to the request from the first terminal, and in a case that the multicast-unicast converting apparatus already belongs to the multicast group, makes a requisition for the content corresponding to the request from the first terminal to the multicast group, and in a case that the multicast-unicast converting apparatus does not belong to the multicast group, makes a requisition for the content in unicast communication to the multicast-unicast/multicast-multicast converting apparatus,
the second content request unit included in the multicast-unicast/multicast-multicast converting apparatus determines whether the multicast-unicast/multicast-multicast converting apparatus belongs to a multicast group corresponding to content corresponding to a request from the multicast-unicast converting apparatus, and in a case that the multicast-unicast/multicast-multicast converting apparatus already belongs to the multicast group, makes a requisition for the content corresponding to the request to the multicast group, and in a case that the multicast-unicast/multicast-multicast converting apparatus does not belong to the multicast group, makes a requisition for the content in unicast communication to the unicast-multicast converting apparatus, and
the first content transmission unit included in the multicast-unicast/multicast-multicast converting apparatus transmits, in a case of receiving a requisition for content in unicast communication from the multicast-unicast converting apparatus, content corresponding to the request in unicast communication to the multicast-unicast converting apparatus, and
the second content transmission unit included in the unicast-multicast converting apparatus transmits, in a case of receiving a requisition for content in unicast communication from the multicast-unicast/multicast-multicast converting apparatus, content corresponding to the request in unicast communication to the multicast-unicast/multicast-multicast converting apparatus.

5. The content delivery system according to claim 1, wherein
the first content receiving cache unit included in the multicast-unicast converting apparatus determines whether a loss occurs in the content group received in multicast communication from the multicast-unicast/multicast-multicast converting apparatus, and in a case that the loss occurs, the first content request unit included in the multicast-unicast converting apparatus makes a requisition for content in unicast communication to the multicast-unicast/multicast-multicast converting apparatus,
the second content receiving cache unit included in the multicast-unicast/multicast-multicast converting apparatus determines whether a loss occurs in the content group received in multicast unit from the unicast-multicast converting apparatus, and in a case that the loss occurs, the second content request unit included in the multicast-unicast/multicast-multicast converting apparatus makes a requisition for content in unicast communication to the unicast-multicast converting apparatus,
the first content transmission unit included in the multicast-unicast/multicast-multicast converting apparatus transmits, in a case of receiving a requisition for content in unicast communication from the multicast-unicast converting apparatus, content corresponding to the request in unicast communication to the multicast-unicast converting apparatus, and the second content transmission unit included in the unicast-multicast converting apparatus transmits, in a case of receiving a requisition for content in unicast communication from the multicast-unicast/multicast-multicast converting apparatus, content corresponding to the request in unicast communication to the multicast-unicast/multicast-multicast converting apparatus.

6. The content delivery system according to claim 1, wherein
the first content transmission unit included in the unicast-multicast converting apparatus or the multicast-unicast/multicast-multicast converting apparatus independently controls, when transmitting content in multicast communication, a transmission interval, transmission rate, or address of a packet for transmitting the content depending on a network environment of the multicast communication network of a transmission destination, or reception capability or limitation in the second content receiving cache unit.

7. A content delivery method performed by a content delivery system in which a terminal and a content server are connected through an intermediate section using a multicast communication network in a unicast communication web delivery system, the content delivery system including
a unicast-multicast converting apparatus includes a first computer processor and a first storage medium having first computer-executable instructions executed by the first computer processor, wherein the unicast-multicast converting apparatus is configured to convert a communication from a unicast communication to a multicast communication to send the communication to a first multicast communication network for transmitting a multicast communication,
a multicast-unicast/multicast-multicast converting apparatus includes a second computer processor and a second storage medium having computer-executable instructions executed by the second computer processor, wherein the multicast-unicast/multicast-multicast converting apparatus is configured to send to a second multicast communication network for transmitting, again in multicast communication, the communication transmitted in a multicast manner in the first multicast communication network, and
a multicast-unicast converting apparatus includes a third computer processor and a third storage medium having computer-executable instructions executed by the second computer processor, wherein the multicast-unicast converting apparatus is configured to convert the communication transmitted in a multicast manner in the second multicast communication network to a unicast communication,
the content delivery method comprising:
performing, by the multicast unicast converting apparatus,
a content receiving cache procedure including identifying content groups each including a plurality of contents grouped, receiving content transmitted using either one or both of unicast communication and multicast communication schemes for each of the content groups from the second multicast communication network, and storing the content included in the content group in a content receiving cache unit, a unicast transmission procedure including transmitting content in unicast communication from the content receiving cache unit included in the multicast-unicast converting apparatus in response to a request from a first terminal connected through the second multicast communication network, and
a content request procedure including selectively making, in a case that content corresponding to the request from the first terminal is not stored in the content receiving cache unit, a requisition for a content group including the content corresponding to the request, using either one or both of unicast communication and multicast communication schemes;
performing, by the multicast-unicast/multicast-multicast converting apparatus,
a content receiving cache procedure including identifying the content group, receiving content transmitted using either one or both of unicast communication and multicast communication schemes for each of the content groups from the first multicast communication network, and storing the content included in the content group in a content receiving cache unit,
a unicast transmission procedure including transmitting content from the content receiving cache unit included in the multicast-unicast/multicast-multicast converting apparatus in unicast communication in response to the request from the first terminal,
a content transmission procedure including transmitting content from the content receiving cache unit included in the multicast-unicast/multicast-multicast converting apparatus using either one or both of unicast communication and multicast communication schemes for each of the content groups in response to a request from the multicast-unicast converting apparatus, and
a content request procedure including selectively making, in a case that content corresponding to the request from the first terminal or the multicast-unicast converting apparatus is not stored in the content receiving cache unit included in the multicast-unicast/multicast-multicast converting apparatus, a requisition for a content group including the content corresponding to the request using either one or both of unicast communication and multicast communication schemes; and
performing, by the unicast-multicast converting apparatus,
a unicast receiving cache procedure including receiving content in unicast communication from the content server and storing the content in a unicast receiving cache unit,
a content transmission procedure including reading, from the unicast receiving cache unit, a content group corresponding to the request from the multicast-unicast converting apparatus or the multicast-unicast/multicast-multicast converting apparatus, and transmitting the read content group to the first multicast communication network using either one or both of unicast communication and multicast communication schemes, and
a unicast request procedure including making, in a case that the content group corresponding to the request from the multicast-unicast converting apparatus or the multicast-unicast/multicast-multicast converting apparatus is not stored in the unicast receiving cache unit, a requisition to the content server for the content group corresponding to the request from the multicast-unicast converting apparatus or the multicast-unicast/multicast-multicast converting apparatus in unicast communication.

8. A multicast-unicast/multicast-multicast converting apparatus connected to an intermediate section between a terminal and a content server in a unicast communication web delivery system, and capable of sending a communication transmitted in a multicast manner by a first multicast communication network to a second multicast communication network different from the first multicast communication network, the apparatus comprising:

includes a computer processor and a storage medium having computer-executable instructions executed by the computer processor, wherein the instructions perform as:

a content receiving cache unit configured to identify content groups each including a plurality of contents grouped, receive content transmitted using either one or both of unicast communication and multicast communication schemes for each of the content groups from the first multicast communication network, and store the content included in the content group;

a unicast transmission unit configured to transmit content in unicast communication from the content receiving cache unit included in the multicast-unicast/multicast-multicast converting apparatus in response to a request from the terminal connected through the first multicast communication network;

a content transmission unit configured to transmit content from the content receiving cache unit included in the multicast-unicast/multicast-multicast converting apparatus using either one or both of unicast communication and multicast communication schemes for each of the content groups in response to a request from a multicast-unicast converting apparatus, the multicast-unicast converting apparatus being capable of converting a multicast communication transmitted by the second multicast communication network to a unicast communication; and a content request unit configured to selectively make, in a case that content corresponding to the request from the terminal or the multicast-unicast converting apparatus is not stored in the content receiving cache unit, a requisition for a content group including the content corresponding to the request to the first multicast communication network using either one or both of unicast communication and multicast communication schemes.

9. A non-transitory computer-readable medium having computer-executable instructions that, upon execution of the instructions by a processor of a computer, cause the computer to function as the multicast-unicast/multicast-multicast converting apparatus according to claim 8.

* * * * *